US011840595B2

(12) United States Patent
Ito

(10) Patent No.: US 11,840,595 B2
(45) Date of Patent: Dec. 12, 2023

(54) SOLID CATALYST COMPONENT FOR OLEFIN POLYMERIZATION

(71) Applicant: SUMITOMO CHEMICAL COMPANY, LIMITED, Tokyo (JP)

(72) Inventor: Masaki Ito, Chiba (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 220 days.

(21) Appl. No.: 17/392,684

(22) Filed: Aug. 3, 2021

(65) Prior Publication Data

US 2022/0041763 A1  Feb. 10, 2022

(30) Foreign Application Priority Data

Aug. 7, 2020 (JP) ................................. 2020-134339
Apr. 27, 2021 (JP) ................................. 2021-075193

(51) Int. Cl.
*C08F 4/16* (2006.01)
*C08F 4/12* (2006.01)

(52) U.S. Cl.
CPC . *C08F 4/16* (2013.01); *C08F 4/12* (2013.01)

(58) Field of Classification Search
CPC ...... C08F 4/16; C08F 4/76; C08F 4/12; C08F 2410/06
See application file for complete search history.

(56) References Cited

U.S. PATENT DOCUMENTS

| | | | | |
|---|---|---|---|---|
| 5,194,531 | A * | 3/1993 | Toda ........................ | C08F 10/00 526/128 |
| 2008/0180660 | A1* | 7/2008 | Lewis .................... | G01J 3/0289 356/300 |
| 2015/0240002 | A1* | 8/2015 | Hosaka ............... | C08F 297/083 502/111 |
| 2016/0102156 | A1* | 4/2016 | Umezawa-Vizzini ...................... | C08F 110/06 502/107 |

FOREIGN PATENT DOCUMENTS

| | | |
|---|---|---|
| CN | 108117617 A | 5/2021 |
| JP | 2003-342214 A | 12/2003 |
| JP | 2004-182981 A | 7/2004 |
| WO | 2018/230700 A1 | 12/2018 |

OTHER PUBLICATIONS

McKenna, Macromolecular Reaction Engineering, 2010, 4, 40-64 (Year: 2010).*

* cited by examiner

*Primary Examiner* — Robert C Boyle
(74) *Attorney, Agent, or Firm* — Meunier Carlin & Curfman LLC

(57) ABSTRACT

To produce an olefin-based polymer having a minor amount of decrease in bulk density due to heat.

A solid catalyst component for olefin polymerization containing a titanium atom, a magnesium atom, a halogen atom, and as internal electron donor, and having an envelope E1 calculated by the following Formula (1) in a range of 0.810 to 0.920.

$$E1 = LE1/LS1 \quad (1)$$

(In Formula, LE1 is a convex hull perimeter of the solid catalyst component for olefin polymerization obtained from an image of the solid catalyst component for olefin polymerization captured with a scanning electron microscope, and LS1 is an actual perimeter of the solid catalyst component for olefin polymerization obtained from the image of the solid catalyst component for olefin polymerization captured with the scanning electron microscope.)

8 Claims, 5 Drawing Sheets

(1)

(2)

(3)

SOLID CATALYST COMPONENT FOR OLEFIN POLYMERIZATION

CROSS-REFERENCE TO RELATED APPLICATIONS

This application is a non-provisional utility U.S. Application, which claims priority to and benefit of Japanese Application serial number 2020-134339, filed Aug. 7, 2020 and Japanese Application serial number 2021-075193, filed Apr. 27, 2021, the contents of which are fully incorporated by reference and made a part hereof.

BACKGROUND OF THE INVENTION

Field of the Invention

The present invention relates to a solid catalyst component for olefin polymerization, a catalyst for olefin polymerization, an olefin-based polymer, a method for producing a solid catalyst component for olefin polymerization, a method for producing a precursor of a solid catalyst component for olefin polymerization, and a method for producing an olefin-based polymer.

Description of the Related Art

In the related art, many kinds of solid catalyst components containing a titanium atom, a magnesium atom, a halogen atom, and an internal electron donor have been proposed as components of a catalyst for olefin polymerization.

For example, JP-A-2004-182981 discloses a solid catalyst component for producing a propylene impact copolymer obtained by contact between a halogenated compound, an electron donor, and a precursor of a solid catalyst component having a specific large mean particle diameter. Such a solid catalyst component enables production of a propylene impact copolymer with excellent powder properties. On the other hand, in olefin polymerization, it is desired to improve the productivity of a polymer.

SUMMARY OF THE INVENTION

For the purpose of further improvement in productivity of a polymer, the present invention provides a solid catalyst component for olefin polymerization having specific properties, a method for producing the same, an olefin-based polymer, and the like.

The present invention provides the following techniques.

[1]
A solid catalyst component for olefin polymerization containing a titanium atom, a magnesium atom, a halogen atom, and an internal electron donor, and having an envelope E1 calculated by the following Formula (1) in a range of 0.810 to 0.920:

$$E1 = LE1/LS1 \quad (1)$$

(where LE1 is a convex hull perimeter of the solid catalyst component for olefin polymerization obtained from an image of the solid catalyst component for olefin polymerization captured with a scanning electron microscope, and LS1 is an actual perimeter of the solid catalyst component for olefin polymerization obtained from the image of the solid catalyst component for olefin polymerization captured with the scanning electron microscope).

[2]
The solid catalyst component for olefin polymerization according to [1], in which E1 is 0.840 to 0.920.

[3]
The solid catalyst component for olefin polymerization according to [2], in which E1 is 0.860 to 0.915.

[4]
The solid catalyst component for olefin polymerization according to any one of [1] to [3], in which the internal electron donor is at least one selected from the group consisting of monoester compounds, aliphatic dicarboxylic acid ester compounds, aromatic dicarboxylic acid ester compounds, diol diester compounds, and ether compounds.

[5]
The solid catalyst component for olefin polymerization according to any one of [1] to [4], in which the internal electron donor is at least one selected from the group consisting of aliphatic dicarboxylic acid ester compounds, and aromatic dicarboxylic acid ester compounds.

[6]
The solid catalyst component for olefin polymerization according to any one of [1] to [5], in which an olefin contains at least one component selected from propylene, ethylene, and 1-butene.

[7]
A catalyst for olefin polymerization containing the solid catalyst component for olefin polymerization according to any one of [1] to [6], and an organoaluminum compound.

A method for producing an olefin-based polymer, the method involving olefin polymerization in the presence of the catalyst for olefin polymerization according to [7].

[9]
A method for producing a solid catalyst component for olefin polymerization containing a titanium atom, a magnesium atom, a halogen atom, and an internal electron donor, the method involving:

reacting an organosilicon compound (a1) having a Si—O bond, a titanium compound (a2) represented by the following Formula [I], and an organomagnesium compound (a3) with each other to obtain a precursor of a solid catalyst component for olefin polymerization, in which, in the reacting, Q calculated by the following Formula (2) is in a range of 0.15 to 0.45:

[Formula I]

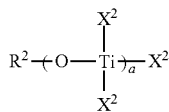

(where a is an integer of 1 to 20, $R^2$ is a $C_{1-20}$ hydrocarbon group, and $X^2$ is a halogen atom or a $C_{1-20}$ oxy-hydrocarbon group, and a plurality of $X^2$ may be the same or different); and $$Q = D \times W \times n \times VF^{0.2} \quad (2)$$

(where D is a ratio of a diameter of a reaction vessel to a diameter of a stirrer blade, W is a ratio of a width of the stirrer blade to the diameter of the stirrer blade, n is the number of revolutions per second (rps) of the stirrer blade, and VF is a feeding speed (mol/s) of the organomagnesium compound (a3)).

The method for producing a solid catalyst component for olefin polymerization according to [9], in which Q is 0.21 to 0.45.

[11]

The method for producing a solid catalyst component for olefin polymerization according to [10], in which Q is 0.25 to 0.40.

A method for producing a precursor of a solid catalyst component for olefin polymerization containing a titanium atom, a magnesium atom, and a halogen atom, the method involving:

reacting an organosilicon compound (a1) having a Si—O bond, a titanium compound (a2) represented by the following Formula [I], and an organomagnesium compound (a3) with each other, in which, in the reacting, Q calculated by the following Formula (2) is in a range of 0.15 to 0.45:

[Formula I]

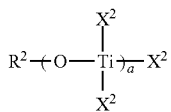

(where a is an integer of 1 to 20, $R^2$ is a $C_{1-20}$ hydrocarbon group, and $X^2$ is a halogen atom or a $C_{1-20}$ oxy-hydrocarbon group, and a plurality of $X^2$ may be the same or different); and $$Q = D \times W \times n \times VF^{0.2} \qquad (2)$$

(where D is a ratio of a diameter of a reaction vessel to a diameter of a stirrer blade, W is a ratio of a width of the stirrer blade to the diameter of the stirrer blade, n is the number of revolutions per second (rps) of the stirrer blade, and VF is a feeding speed (mol/s) of the organomagnesium compound (a3)).

The method for producing a precursor of a solid catalyst component for olefin polymerization according to [12], in which Q is 0.21 to 0.45.

[14]

The method for producing a precursor of a solid catalyst component for olefin polymerization according to [13], in which Q is 0.25 to 0.40.

[15]

An olefin-based polymer having an envelope E2 calculated by the following Formula (3) in a range of 0.820 to 0.885:

$$E2 = LE2/LS2 \qquad (3)$$

(where LE2 is a convex hull perimeter of the olefin-based polymer obtained from an image of the olefin-based polymer captured with a scanning electron microscope, and LS2 is an actual perimeter of the olefin-based polymer obtained from the image of the olefin-based polymer captured with the scanning electron microscope).

[16]

The olefin-based polymer according to [15], having an amount of decrease in bulk density due to heat (ABD) in a range of −0.012 to −0.000, the amount being calculated by the following Formula (4):

ABD=(bulk density at 60° C.)−(bulk density at room temperature)  (4)

According to the present invention, an olefin-based polymer to be produced has a minor amount of decrease in bulk density due to heat (ΔBD(g/cm³)). This indicates that heating an olefin-based polymer causes surface stickiness but the olefin-based polymer to be produced herein has a small degree of adhesion between particles. Therefore, in production of an olefin-based polymer, using the solid catalyst component for olefin polymerization of the present invention makes it possible to remedy clogging of a polymerization device and adhesion of a polymer to a wall surface of the polymerization device during olefin polymerization. In addition, it is possible to increase the weight of an olefin-based polymer to be produced by a polymerization device and to increase a flow rate of gas flowing through the polymerization device, thereby improving the productivity of a polymer.

DETAILED DESCRIPTION OF THE PREFERRED EMBODIMENTS

Figure 1:
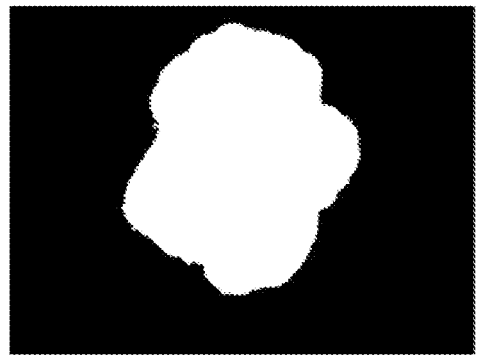
FIG. 1 is a planar image of a solid catalyst component for olefin polymerization 1 obtained in Example 1 by a scanning electron microscope.
Figure 2:
FIG. 2 is a planar image of an olefin-based polymer 1 obtained in Example 1 by a scanning electron microscope.
Figure 3:
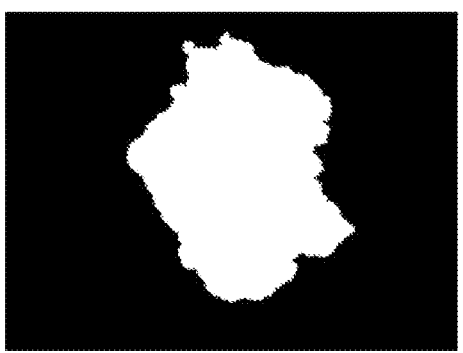
FIG. 3 is a planar image of a solid catalyst component for olefin polymerization C3 obtained in Comparative Example 3 by a scanning electron microscope.
Figure 4:
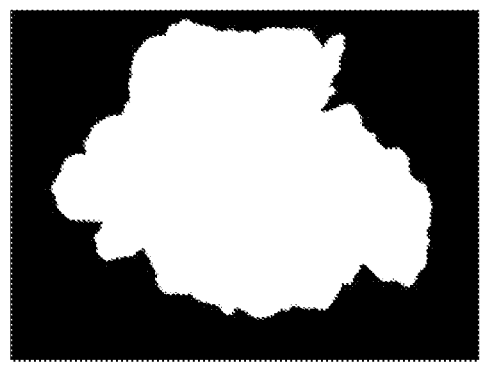
FIG. 4 is a planar image of an olefin-based polymer C3 obtained in Comparative Example 3 by a scanning electron microscope.

<Solid Catalyst Component for Olefin Polymerization (A)>

A solid catalyst component for olefin polymerization (A) according to the present invention contains a titanium atom, a magnesium atom, a halogen atom, and an internal electron donor and has an envelope E1 calculated by the following Formula (1) in a range of 0.810 to 0.920.

$$E1 = LE1/LS1 \qquad (1)$$

(In Formula, LE1 is a convex hull perimeter of the solid catalyst component for olefin polymerization obtained from an image of the solid catalyst component for olefin polymerization captured with a scanning electron microscope, and LS1 is an actual perimeter of the solid catalyst component for olefin polymerization obtained from the image of the solid catalyst component for olefin polymerization captured with the scanning electron microscope.)

Preferably, E1 is 0.840 to 0.920. More preferably, E1 is 0.860 to 0.915.

The "solid catalyst component for olefin polymerization" herein represents a solid content which exists at least in toluene and serves as a catalyst for olefin polymerization when combined with an auxiliary catalyst for olefin polymerization such as an organoaluminum compound.

Some or all titanium atoms in the solid catalyst component for olefin polymerization are derived from titanium halide compounds. Some or all halogen atoms in the solid catalyst component for olefin polymerization are derived from titanium halide compounds.

Some or all magnesium atoms in the solid catalyst component for olefin polymerization are derived from metallic magnesium or magnesium compounds. In addition, some halogen atoms in the solid catalyst component for olefin polymerization may be derived from magnesium compounds.

The solid catalyst component for olefin polymerization has a specific surface area of typically 100 to 700 m²/g, preferably 200 to 600 m²/g, and more preferably 300 to 500 m²/g. The specific surface area of the solid catalyst component for olefin polymerization can be measured with a gas adsorption measuring device.

<Method for Producing Solid Catalyst Component for Olefin Polymerization (A)>

<Method for Producing Precursor of Solid Catalyst Component for Olefin Polymerization (a)>

A method for producing a solid catalyst component for olefin polymerization (A) of the present invention is a method for producing a solid catalyst component for olefin polymerization containing a titanium atom, a magnesium atom, a halogen atom, and an internal electron donor, the method involving:

reacting an organosilicon compound (a1) having a Si—O bond, a titanium compound (a2) represented by the following Formula [I], and an organomagnesium compound (a3) with each other to obtain a precursor of a solid catalyst component for olefin polymerization, in which, in the reacting, Q calculated by the following Formula (2) is in a range of 0.15 to 0.45.

[Formula I]

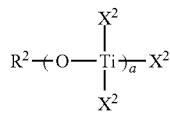

(In Formula, a is an integer of 1 to 20, $R^2$ is a $C_{1-20}$ hydrocarbon group, and $X^2$ is a halogen atom or a $C_{1-20}$ oxy-hydrocarbon group, and a plurality of $X^2$ may be the same or different.)

$$Q = D \times W \times n \times VF^{0.2} \quad (2)$$

(In Formula, D is a ratio of a diameter of a reaction vessel to a diameter of a stirrer blade, W is a ratio of a width of the stirrer blade to the diameter of the stirrer blade, n is the number of revolutions per second (rps) of the stirrer blade, and VF is a feeding speed (mol/s) of the organomagnesium compound (a3).)

Preferably, Q is 0.21 to 0.45. More preferably, Q is 0.25 to 0.40.

A method for producing a precursor of a solid catalyst component for olefin polymerization (a) of the present invention is a method for producing a precursor of a solid catalyst component for olefin polymerization containing a titanium atom, a magnesium atom, and a halogen atom, the method involving:

reacting an organosilicon compound (a1) having a Si—O bond, a titanium compound (a2) represented by the following Formula [I], and an organomagnesium compound (a3) with each other, in which, in the reacting, Q calculated by the following Formula (2) is in a range of 0.15 to 0.45.

[Formula I]

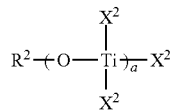

(In Formula, a is an integer of 1 to 20, $R^2$ is a $C_{1-20}$ hydrocarbon group, and $X^2$ is a halogen atom or a $C_{1-20}$ oxy-hydrocarbon group, and a plurality of $X^2$ may be the same or different.)

$$Q = D \times W \times n \times VF^{0.2} \quad (2)$$

(In Formula, D is a ratio of a diameter of a reaction vessel to a diameter of a stirrer blade, W is a ratio of a width of the stirrer blade to the diameter of the stirrer blade, n is the number of revolutions per second (rps) of the stirrer blade, and VF is a feeding speed (mol/s) of the organomagnesium compound (a3).)

Preferably, Q is 0.21 to 0.45. More preferably, Q is 0.25 to 0.40.

The solid catalyst component for olefin polymerization (A) of the present invention is preferably obtained by contact between the following (a), (b), and (c). It is more preferable to use an organic acid halide (d) as a component for the contact since the organic acid halide (d) enables excellent stereoregular polymerization. That is, the solid catalyst component for olefin polymerization (A) of the present invention is preferably a solid catalyst component for olefin polymerization obtained by contact between the following (a), (b), (c), and (d).

(a) Precursor of a solid catalyst component obtained by reducing a titanium compound (a2) represented by the following Formula [I] with an organomagnesium compound (a3) in the presence of an organosilicon compound (a1) having a Si—O bond

[Formula I]

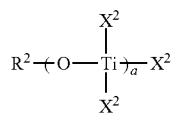

(where a is a numeral of 1 to 20, $R^2$ is a $C_{1-20}$ hydrocarbon group, and $X^2$ is a halogen atom or a $C_{1-20}$ oxy-hydrocarbon group, and all $X^2$ may be the same or different);

(b) Halogenated compound;

(c) Internal electron donor; and (d) Organic acid halide.

Furthermore, it is preferable to perform the reduction reaction in the presence of an ester compound (a4) as an optional component since the ester compound (a4) further enhances the polymerization activity and stereoregular polymerization.

(a) Precursor of Solid Catalyst Component

The precursor of a solid catalyst component (a) is preferably obtained by reducing the titanium compound (a2) represented by the following Formula [I] with the organomagnesium compound (a3) in the presence of the organosilicon compound (a1) having a Si—O bond.

[Formula I]

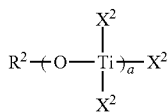

(In Formula, a is a numeral of 1 to 20, $R^2$ is a $C_{1-20}$ hydrocarbon group, and $X^2$ is a halogen atom or a $C_{1-20}$ oxy-hydrocarbon group, and all $X^2$ may be the same or different.)

Here, it is preferable to perform the reduction reaction in the presence of the ester compound (a4) as an optional component since the ester compound (a4) further enhances the polymerization activity and stereoregular polymerization.

Examples of the organosilicon compound (a1) having a Si—O bond include those represented by the following Formula.

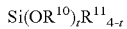

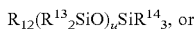

Here, $R^{10}$ is a $C_{1-20}$ hydrocarbon group, and $R^{11}$, $R^{12}$, $R^{13}$, $R^{14}$, and Rn independently are a $C_{1-20}$ hydrocarbon group or a hydrogen atom. Furthermore, t is an integer satisfying $0<t\leq 4$, u is an integer of 1 to 1000, and v is an integer of 2 to 1000.

Specific examples of the organosilicon compound include tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane, and phenylhydropolysiloxane.

Among these examples, the organosilicon compound is preferably an alkoxysilane compound represented by Formula) $Si(OR^{10})_tR^{11}_{4-t}$ where t is a numeral satisfying $1\leq t\leq 4$, and particularly preferably tetraalkoxysilane with t=4, and most preferably tetraethoxysilane.

The titanium compound (a2) is represented by the following Formula [I].

[Formula I]

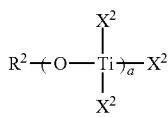

(In Formula, a is a numeral of 1 to 20, $R^2$ is a $C_{1-20}$ hydrocarbon group, and $X^2$ is a halogen atom or a $C_{1-20}$ oxy-hydrocarbon group, and all $X^2$ may be the same or different.)

Specific examples of $R^2$ include alkyl groups such as methyl, ethyl, propyl, isopropyl, butyl, isobutyl, amyl, isoamyl, hexyl, heptyl, octyl, decyl, and dodecyl groups; aryl groups such as phenyl, cresyl, xylyl, and naphthyl groups; cycloalkyl groups such as cyclohexyl and cyclopentyl groups; allyl groups such as propenyl group; and aralkyl groups such as benzyl group.

Among these examples, a $C_{2-18}$ alkyl group or a $C_{6-18}$ aryl group is preferable. Particularly, a linear $C_{2-18}$ alkyl group is preferable.

Examples of the halogen atom in $X^2$ include a chlorine atom, a bromine atom, and an iodine atom.

Particularly, a chlorine atom is preferable. The $C_{1-20}$ oxy-hydrocarbon group in $X^2$ is an oxy-hydrocarbon group having a $C_{1-20}$ hydrocarbon group similar to that in $R^2$. $X^2$ is particularly preferably an alkoxy group having a linear $C_{2-18}$ alkyl group.

In the titanium compound represented by Formula [I], a is a numeral of 1 to 20 and preferably a numeral satisfying $1\leq a\leq 5$.

Specific examples of the titanium compound include tetramethoxytitanium, tetraethoxytitanium, tetra-n-propoxytitanium, tetra-iso-propoxytitanium, tetra-n-butoxytitanium, tetra-iso-butoxytitanium, tetra-iso-butoxytitanium, n-butoxytitanium trichloride, di-n-butoxytitanium dichloride, tri-n-butoxytitanium chloride, di-n-tetraisopropyl polytitanate (mixture with a=2 to 10), tetra-n-butyl polytitanate (mixture with a=2 to 10), tetra-n-hexyl polytitanate (mixture with a=2 to 10), and tetra-n-octyl polytitanate (mixture with a=2 to 10). Another example of the titanium compound includes a condensate of tetraalkoxytitanium obtained by reacting a small amount of water with tetraalkoxytitanium.

The titanium compound (a2) is preferably a titanium compound in which a in the titanium compound represented by Formula [I] is 1, 2, or 4.

Particularly, the titanium compound (a2) is preferably tetra-n-butoxytitanium, tetra-n-butyltitanium dimer, or tetra-n-butyltitanium tetramer.

With regard to the titanium compound (a2), note that a plurality of kinds thereof may be mixed and used.

The organomagnesium compound (a3) is an organomagnesium compound of any type having a magnesium-carbon bond. Particularly, preferred examples of the organomagnesium compound (a3) include Grignard compounds represented by Formula $R^{16}MgX^5$ (where Mg is a magnesium atom, $R^{16}$ is a $C_{1-20}$ hydrocarbon group, and $X^5$ is a halogen atom) or dihydrocarbyl magnesium represented by Formula $R^{17}R^{18}Mg$ (where Mg is a magnesium atom, and $R^{17}$ and Rn independently are a $C_{1-20}$ hydrocarbon group). Here, $R^{17}$ and $R^{18}$ may be the same or different. Specific examples of $R^{16}$ to Rn include $C_{1-20}$ alkyl, aryl, aralkyl, and alkenyl groups such as methyl, ethyl, propyl, isopropyl, butyl, sec-butyl, tert-butyl, isoamyl, hexyl, octyl, 2-ethylhexyl, phenyl, and benzyl groups.

Particularly, it is preferable to use a Grignard compound represented by $R^{16}MgX^5$ in an ether solution from a viewpoint of catalyst performance.

It is also possible to use a hydrocarbon-soluble complex of the organomagnesium compound and an organic metal that solubilizes the organomagnesium compound in a hydrocarbon. Examples of organometallic compounds include Li, Be, B, Al, or Zn compounds.

As the ester compound (a4), a monovalent or polyvalent carboxylic acid ester is used, and examples thereof include saturated aliphatic carboxylic acid esters, unsaturated aliphatic carboxylic acid esters, alicyclic carboxylic acid esters, and aromatic carboxylic acid esters. Specific examples of the ester compound (e4) include methyl acetate, ethyl acetate, phenyl acetate, methyl propionate, ethyl propionate, ethyl butyrate, ethyl valerate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, diheptyl phthalate, di-n-octyl phthalate, di(2-ethylhexyl) phthalate, diisodecyl phthalate, dicyclohexyl phthalate, and diphenyl phthalate.

Among these examples, preferred ester compounds are unsaturated aliphatic carboxylic acid esters such as methacrylic acid esters and maleic acid esters or aromatic carboxylic acid esters such as phthalic acid esters. Particularly, dialkyl esters of phthalic acid are preferably used.

The precursor of a solid catalyst component (a) is preferably obtained by reducing the titanium compound (a2) with the organomagnesium compound (a3) in the presence of the organosilicon compound (a1) or in the presence of the organosilicon compound (a1) and the ester compound (a4).

The titanium compound (a2), the organosilicon compound (a1), and the ester compound (a4) are preferably dissolved or diluted in an appropriate solvent before use.

Examples of the solvent include aliphatic hydrocarbons such as hexane, heptane, octane, and decane; aromatic hydrocarbons such as toluene and xylene; alicyclic hydrocarbons such as cyclohexane, methylcyclohexane, and decalin; and ether compounds such as diethyl ether, dibutyl ether, diisoamyl ether, and tetrahydrofuran.

A temperature during the reduction reaction is typically in a range of −50 to 70° C., preferably −30 to 50° C., and particularly preferably −25 to 35° C.

A reaction time is not particularly limited but is typically about 30 minutes to 10 hours.

In the reduction reaction, a porous carrier such as an inorganic oxide and an organic polymer can be used, and the porous carrier can be impregnated with a solid product. The porous carrier to be used may be a known porous carrier. Examples of the porous carrier include porous inorganic oxides as typified by $SiO_2$, $Al_2O_3$, MgO, $TiO_2$, and $ZrO_2$; and porous organic polymers such as polystyrene, styrene-divinylbenzene copolymer, styrene-ethylene glycol dimethacrylate copolymer, polymethyl acrylate, polyethyl acrylate, methyl acrylate-divinylbenzene copolymer, polymethyl methacrylate, methyl methacrylate-divinylbenzene copolymer, polyacrylonitrile, acrylonitrile-divinylbenzene copolymer, polyvinyl chloride, polyethylene, and polypropylene. Among these examples, a porous organic polymer is preferably used. Particularly, a styrene-divinylbenzene copolymer or an acrylonitrile-divinylbenzene copolymer is preferably used.

The porous carrier preferably has a pore volume of 0.3 cc/g or more and more preferably 0.4 cc/g or more in a pore radius of 200 to 2000 Å, and the pore volume in the range accounts for 35% or more and more preferably 40% or more of a pore volume in a pore radius of 35 to 75000 Å. With a small pore volume, it is not preferable in that the porous carrier does not necessarily immobilize a catalyst component effectively. Even when the porous carrier has a pore volume of 0.3 cc/g or more, if the pore volume is not enough in the pore radius of 200 to 2000 Å, it is not preferable because the porous carrier may not immobilize a catalyst component effectively.

Such a precursor of a solid catalyst component used in the present invention is adjusted by the reduction reaction while being stirred.

In the stirring, a reaction temperature is typically −5° C. to 50° C., preferably 0° C. to 25° C., and more preferably 5° C. to 10° C.

With regard to an amount of a solvent in the stirring, typically, (a1+a2)/(a1+a2+solvent)=20 to 60 ml/ml and more preferably 30 to 50 ml/ml.

With regard to a ratio of reaction components, a ratio of a1 to a3, or an atomic ratio of contained Si atom to Mg atom (Si/Mg), is typically 0.4 to 5 mol/mol, preferably 0.6 to 2 mol/mol, and more preferably 0.8 to 1 mol/mol. In addition, a ratio of a2 to a3, or an atomic ratio of contained Ti atom to Mg atom (Ti/Mg), is typically 0.01 to 0.15 mol/mol, preferably 0.03 to 0.1 mol/mol, and more preferably 0.05 to 0.07 mol/mol. When a4 as an optional component is used, a ratio of a4 to a3, or a ratio of ester group to Mg atom (ester group/Mg), is typically 0.003 to 0.08 mol/mol and preferably 0.006 to 0.06 mol/mol.

The precursor of a solid catalyst component obtained by the reduction reaction is typically subjected to solid-liquid separation and washed several times with an inert hydrocarbon solvent such as hexane, heptane, or toluene.

From a viewpoint of polymerization activity and stereoregularity, the precursor of a solid catalyst component used in the present invention is preferably subjected to heat treatment in advance in preparation of the solid catalyst component. It is preferable that the precursor of a solid catalyst component is heated in a slurry state in an inert hydrocarbon solvent. A heating temperature is typically 40 to 120° C. and preferably 60° C. to 100° C. A heating time is typically in a range of 30 minutes to 10 hours.

The resulting precursor of a solid catalyst component contains a trivalent titanium atom, a magnesium atom, and an oxy-hydrocarbon group and generally reflects amorphous nature or extremely weak crystalline nature. From a viewpoint of catalyst performance, an amorphous structure is particularly preferable.

(b) Halogenated Compound

The halogenated compound is preferably a compound that substitutes the oxy-hydrocarbon group in the precursor of a solid catalyst component (a) with a halogen atom. Particularly, a halide of Group 4 elements, a halide of Group 13 elements, or a halide of Group 14 elements is preferable.

Preferred examples of the halide of Group 4 elements includes halides represented by Formula $M(OR^9)_b X^4_{4-b}$ (where M is an element in Group 4, $R^9$ is a $C_{1-20}$ hydrocarbon group, $X^4$ is a halogen atom, and b is a numeral satisfying 0≤b<4). Specific examples of M include titanium, zirconium, and hafnium. Particularly, titanium is preferable. Specific examples of $R^9$ include alkyl groups such as methyl, ethyl, propyl, isopropyl, butyl, isobutyl, tert-butyl, amyl, isoamyl, tert-amyl, hexyl, heptyl, octyl, decyl, and dodecyl groups; aryl groups such as phenyl, cresyl, xylyl, and naphthyl groups; allyl groups such as propenyl group; and aralkyl groups such as benzyl group. Among these examples, a $C_{2-18}$ alkyl group or a $C_{6-18}$ aryl group is preferable. Particularly, a linear $C_{2-18}$ alkyl group is preferable. It is also possible to use a halide of Group 4 elements having two or more different $OR^9$ groups.

Examples of the halogen atom represented by $X^4$ include a chlorine atom, a bromine atom, and an iodine atom. Among these examples, a chlorine atom gives particularly preferable results.

With regard to the halide of Group 4 elements represented by Formula $M(OR^9)_b X^4_{4-b}$, b is a numeral satisfying $0 \leq b < 4$, preferably a numeral satisfying $0 \leq b \leq 2$, and particularly preferably b=0.

Specific examples of titanium compounds represented by Formula $M(OR^9)_b X^4_{4-b}$ include tetrahalogenated titanium such as titanium tetrachloride, titanium tetrabromide, and titanium tetraiodide; trihalogenated alkoxytitanium such as methoxytitanium trichloride, ethoxytitanium trichloride, butoxytitanium trichloride, phenoxytitanium trichloride, and ethoxytitanium tribromide; dihalogenated dialkoxytitanium such as dimethoxytitanium dichloride, diethoxytitanium dichloride, dibutoxytitanium dichloride, diphenoxytitanium dichloride, and diethoxytitanium dibromide; and zirconium compounds and hafnium compounds corresponding to the above examples. The most preferable example is titanium tetrachloride.

Preferred examples of the halide of Group 13 elements or Group 14 elements include compounds represented by Formula $MR_{m-a}X_a$ (where M is an atom in Group 13 or Group 14, R is a $C_{1-20}$ hydrocarbon group, X is a halogen atom, m is a valence of M, and a is a numeral satisfying $0 < a \leq m$).

Examples of the atom in Group 13 herein include B, Al, Ga, In, and Tl. Among these example, B or Al is preferable, and Al is more preferable. Examples of the atom in Group 14 include C, Si, Ge, Sn, and Pb. Among these examples, Si, Ge, or Sn is preferable, and Si or Sn is more preferable.

With regard to m representing a valence of M, when M is Si, for example, m=4.

With regard to a representing a numeral that satisfies $0 < a \leq m$, when M is Si, a is preferably 3 or 4.

Examples of the halogen atom represented by X include F, Cl, Br, and I. Among these examples, Cl is preferable.

Specific examples of R include alkyl groups such as methyl, ethyl, n-propyl, isopropyl, n-butyl, isobutyl, amyl, isoamyl, hexyl, heptyl, octyl, decyl, and dodecyl groups; aryl groups such as phenyl, tolyl, cresyl, xylyl, and naphthyl groups; cycloalkyl groups such as cyclohexyl and cyclopentyl groups; alkenyl groups such as propenyl group; and aralkyl groups such as benzyl group. R is preferably an alkyl or aryl group, and particularly preferably a methyl, ethyl, n-propyl, phenyl, or paratolyl group.

Specific examples of the halide of Group 13 elements include trichloroboron, methyldichloroboron, ethyldichloroboron, phenyldichloroboron, cyclohexyldichloroboron, dimethylchloroboron, methylethylchloroboron, trichloroaluminum, methyldichloroaluminum, ethyldichloroaluminum, phenyldichloroaluminum, cyclohexyldichloroaluminum, dimethylchloroaluminum, diethylchloroaluminum, methylethylchloroaluminum, ethylaluminum sesquichloride, gallium chloride, gallium dichloride, trichlorogallium, methyldichlorogallium, ethyldichlorogallium, phenyldichlorogallium, cyclohexyldichlorogallium, dimethylchlorogallium, methylethylchlorogallium, indium chloride, indium trichloride, methyl indium dichloride, phenyl indium dichloride, dimethyl indium chloride, thallium chloride, thallium trichloride, methylthallium dichloride, phenylthallium dichloride, and dimethylthallium chloride. Examples of the halide of Group 13 elements also include these compounds with chloro changed to fluoro, bromo, or iodo.

Specific examples of the halide of Group 14 elements include tetrachloromethane, trichloromethane, dichloromethane, monochloromethane, 1,1,1-trichloroethane, 1,1-dichloroethane, 1,2-dichloroethane, 1,1,2,2-tetrachloroethane, tetrachlorosilane, trichlorosilane, methyltrichlorosilane, ethyltrichlorosilane, n-propyltrichlorosilane, n-butyltrichlorosilane, phenyltrichlorosilane, benzyltrichlorosilane, para-tolyltrichlorosilane, cyclohexyltrichlorosilane, dichlorosilane, methyldichlorosilane, ethyldichlorosilane, dimethyldichlorosilane, diphenyldichlorosilane, methylethyldichlorosilane, monochlorosilane, trimethylchlorosilane, triphenylchlorosilane, tetrachlorogermane, trichlorogermane, methyltrichlorogermane, ethyltrichlorogermane, phenylchlorogermane, dichlorogermane, dimethyldichlorogermane, diethyldichlorogermane, diphenyldichlorogermane, monochlorogermane, trimethylchlorogermane, triethylchlorogermane, tri-n-butylchlorogermane, tetrachlorotin, methyltrichlorotin, n-butyltrichlorotin, dimethyldichlorotin, di-n-butyldichlorotin, diisobutyldichlorotin, diphenyldichlorotin, divinyldichlorotin, methyltrichlorotin, phenyltrichlorotin, dichloroplumbane, methylchloroplumbane, and phenylchloroplumbane. Examples of the halide of Group 14 elements also include these compounds with chloro changed to fluoro, bromo, or iodo.

As the halogenated compound (b), tetrachlorotitanium, methyldichloroaluminum, ethyldichloroaluminum, tetrachlorosilane, phenyltrichlorosilane, methyltrichlorosilane, ethyltrichlorosilane, n-propyltrichlorosilane, or tetrachlorotin is particularly preferable from a viewpoint of polymerization activity.

One type of the halogenated compound (b) may be used independently, or a plurality of kinds of the above compounds may be used in combination.

(c) Internal Electron Donor

The internal electron donor (c) represents an organic compound that donates an electron pair to one or more metal atoms contained in the solid catalyst component for olefin polymerization. Specific examples of the internal electron donor include monoester compounds (β-alkoxy ester compounds), dicarboxylic acid ester compounds (aliphatic dicarboxylic acid ester compounds or aromatic dicarboxylic acid ester compounds), diol diester compounds, and ether compounds. The internal electron donor (c) is preferably at least one selected from the group consisting of aliphatic dicarboxylic acid ester compounds and aromatic dicarboxylic acid ester compounds.

The monoester compounds represent organic compounds having one ester bond (—CO—O—) in a molecule. Preferred examples of the monoester compounds are aromatic carboxylic acid ester compounds and aliphatic carboxylic acid ester compounds. Examples of the aromatic carboxylic acid ester compounds include methyl benzoate, ethyl benzoate, propyl benzoate, butyl benzoate, pentyl benzoate, hexyl benzoate, octyl benzoate, methyl toluate, ethyl toluate, propyl toluate, butyl toluate, pentyl toluate, hexyl toluate, and octyl toluate. Examples of the aliphatic carboxylic acid ester compounds include methyl acetate, ethyl acetate, propyl acetate, butyl acetate, pentyl acetate, hexyl acetate, octyl acetate, methyl propionate, ethyl propionate, propyl propionate, butyl propionate, pentyl propionate, hexyl propionate, octyl propionate, methyl butyrate, ethyl butyrate, propyl butyrate, butyl butyrate, pentyl butyrate, hexyl butyrate, octyl butyrate, methyl valerate, ethyl valerate, propyl valerate, butyl valerate, pentyl valerate, hexyl valerate, octyl valerate, methyl caproate, ethyl caproate, propyl caproate, butyl caproate, pentyl caproate, hexyl caproate, octyl caproate, methyl enanthate, ethyl enanthate, propyl enanthate, butyl enanthate, pentyl enanthate, hexyl enanthate, octyl enanthate, methyl caprylate, ethyl caprylate, propyl caprylate, butyl caprylate, pentyl caprylate, hexyl caprylate, octyl caprylate, methyl pelargonate, ethyl pelargonate, propyl pelargonate, butyl pelargonate, pentyl pelargonate, hexyl pelargonate, octyl pelargonate, methyl caprate, ethyl caprate, propyl caprate, butyl caprate, pentyl caprate, hexyl caprate, octyl caprate, methyl laurate, ethyl laurate, propyl laurate, butyl laurate, pentyl laurate, hexyl laurate, octyl laurate, methyl myristate, ethyl myristate, propyl myristate, butyl myristate, pentyl myristate, hexyl myristate, octyl myristate, methyl palmitate, ethyl palmitate, propyl palmitate, butyl palmitate, pentyl palmitate, hexyl palmitate, octyl palmitate, methyl margarate, ethyl margarate, propyl margarate, butyl margarate, pentyl margarate, hexyl margarate, octyl margarate, methyl stearate, ethyl stearate, propyl stearate, butyl stearate, pentyl stearate, hexyl stearate, and octyl stearate.

The dicarboxylic acid ester compounds represent compounds having two ester bonds (—CO—O—) in a molecule and having a structure in which the two carboxyl groups of a dicarboxylic acid are esterified with monovalent alcohols. Preferred examples of the dicarboxylic acid ester compounds are aromatic dicarboxylic acid ester compounds and aliphatic dicarboxylic acid ester compounds. The aromatic dicarboxylic acid ester compounds represent compounds that can be synthesized from, for example, aromatic dicarboxylic acids or aromatic dicarboxylic acid dihalides and monovalent alcohols. Specific example of the aromatic dicarboxylic acid ester compounds include dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, diheptyl phthalate, di-n-octyl phthalate, di(2-ethylhexyl) phthalate, diisodecyl phthalate, dicyclohexyl phthalate, and diphenyl phthalate. The aliphatic dicarboxylic acid ester compounds represent compounds that can be synthesized from, for example, aliphatic dicarboxylic acids or aliphatic dicarboxylic acid dihalides and monovalent alcohols. Specific examples of the aliphatic dicarboxylic acid ester compounds include dimethyl ethanedioate, diethyl ethanedioate, dipropyl ethanedioate, dibutyl ethanedioate, dipentyl ethanedioate, dihexyl ethanedioate, dioctyl ethanedioate, dimethyl propanedioate, diethyl propanedioate, dipropyl propanedioate, dibutyl propanedioate, dipentyl propanedioate, dihexyl propanedioate, dioctyl propanedioate, dimethyl butanedioate, diethyl butanedioate, dipropyl butanedioate, dibutyl butanedioate, dipentyl butanedioate, dihexyl butanedioate, dioctyl butanedioate, dimethyl pentanedioate, diethyl pentanedioate, dipropyl pentanedioate, dibutyl pentanedioate, dipentyl pentanedioate, dihexyl pentanedioate, dioctyl pentanedioate, dimethyl hexanedioate, diethyl hexanedioate, dipropyl hexanedioate, dibutyl hexanedioate, dipentyl hexanedioate, dihexyl hexanedioate, dioctyl hexanedioate, dimethyl (E)-but-2-enedioate, diethyl (E)-but-2-enedioate, dipropyl (E)-but-2-enedioate, dibutyl (E)-but-2-enedioate, dipentyl (E)-but-2-enedioate, dihexyl (E)-but-2-enedioate, dioctyl (E)-but-2-enedioate, dimethyl (Z)-but-2-enedioate, diethyl (Z)-but-2-enedioate, dipropyl (Z)-but-2-enedioate, dibutyl (Z)-but-2-enedioate, dipentyl (Z)-but-2-enedioate, dihexyl (Z)-but-2-enedioate, dioctyl (Z)-but-2-enedioate, dimethyl cyclohexane-1,2-dicarboxylate, diethyl cyclohexane-1,2-dicarboxylate, dipropyl cyclohexane-1,2-dicarboxylate, dibutyl cyclohexane-1,2-dicarboxylate, dipentyl cyclohexane-1,2-dicarboxylate, dihexyl cyclohexane-1,2-dicarboxylate, dioctyl cyclohexane-1,2-dicarboxylate, dimethyl 1,2-cyclohexene-1,2-dicarboxylate, diethyl 1,2-cyclohexene-1,2-dicarboxylate, dipropyl 1,2-cyclohexene-1,2-dicarboxylate, dibutyl 1,2-cyclohexene-1,2-dicarboxylate, dipentyl 1,2-cyclohexene-1,2-dicarboxylate, dihexyl 1,2-cyclohexene-1,2-dicarboxylate, dioctyl 1,2-cyclohexene-1,2-dicarboxylate, dimethyl 3-methylcyclohexane-1,2-dicarboxylate, diethyl 3-methylcyclohexane-1,2-dicarboxylate, dipropyl 3-methylcyclohexane-1,2-dicarboxylate, dibutyl 3-methylcyclohexane-1,2-dicarboxylate, dipentyl 3-methylcyclohexane-1,2-dicarboxylate, dihexyl 3-methylcyclohexane-1,2-dicarboxylate, dioctyl 3-methylcyclohexane-1,2-dicarboxylate, dimethyl 3,6-dimethylcyclohexane-1,2-dicarboxylate, diethyl 3,6-dimethylcyclohexane-1,2-dicarboxylate, dipropyl 3,6-dimethylcyclohexane-1,2-dicarboxylate, dibutyl 3,6-dimethylcyclohexane-1,2-dicarboxylate, dipentyl 3,6-dimethylcyclohexane-1,2-dicarboxylate, dihexyl 3,6-dimethylcyclohexane-1,2-dicarboxylate, and dioctyl 3,6-dimethylcyclohexane-1,2-dicarboxylate.

The diol diester compounds represent compounds having two ester bonds (—CO—O—) in a molecule and having a structure in which the two hydroxyl groups of a diol esterify the carboxyl group of a monocarboxylic acid or a carboxyl group of a dicarboxylic acid. Examples of the diol diester compounds include 1,2-dibenzoatepropane, 1,2-diacetyloxypropane, 1,2-dibenzoatebutane, 1,2-diacetyloxybutane, 1,2-dibenzoatecyclohexane, 1,2-diacetyloxycyclohexane, 1,3-dibenzoatepropane, 1,3-diacetyloxypropane, 2,4-dibenzoatepentane, 2,4-diacetyloxypentane, 1,2-dibenzoatecyclopentane, 1,2-diacetyloxycyclopentane, 1,2-dibenzoate-4-tert-butyl-6-methylbenzene, 1,2-diacetyloxy-4-tert-butyl-6-methylbenzene, 1,3-dibenzoate-4-tert-butyl-6-methylbenzene, and 1,3-diacetyloxy-4-tert-butyl-6-methylbenzene.

The β-alkoxy ester compounds represent compounds having an alkoxycarbonyl group and an alkoxy group at β-position of the alkoxycarbonyl group. Specific example of the β-alkoxy ester compounds include methyl 2-methoxymethyl-3,3-dimethylbutanoate, ethyl 2-methoxymethyl-3,3-dimethylbutanoate, propyl 2-methoxymethyl-3,3-dimethylbutanoate, butyl 2-methoxymethyl-3,3-dimethylbutanoate, pentyl 2-methoxymethyl-3,3-dimethylbutanoate, hexyl 2-methoxymethyl-3,3-dimethylbutanoate, octyl 2-methoxymethyl-3,3-dimethylbutanoate, methyl 3-methoxy-2-phenylpropionate, ethyl 3-methoxy-2-phenylpropionate, propyl 3-methoxy-2-phenylpropionate, butyl 3-methoxy-2-phenylpropionate, pentyl 3-methoxy-2-phenylpropionate, hexyl 3-methoxy-2-phenylpropionate, octyl 3-methoxy-2-phenylpropionate, methyl 2-ethoxymethyl-3,3-dimethylbutanoate, ethyl 2-ethoxymethyl-3,3-dimethylbutanoate, propyl 2-ethoxymethyl-3,3-dimethylbutanoate, butyl 2-ethoxymethyl-3,3-dimethylbutanoate, pentyl 2-ethoxymethyl-3,3-dimethylbutanoate, hexyl 2-ethoxymethyl-3,3-dimethylbutanoate, octyl 2-ethoxymethyl-3,3-dimethylbutanoate, methyl 3-ethoxy-2-phenylpropionate, ethyl 3-ethoxy-2-phenylpropionate, propyl 3-ethoxy-2-phenylpropionate, butyl 3-ethoxy-2-phenylpropionate, pentyl 3-ethoxy-2-phenylpropionate, hexyl 3-ethoxy-2-phenylpropionate, octyl 3-ethoxy-2-phenylpropionate, methyl 2-propyloxymethyl-3,3-dimethylbutanoate, ethyl 2-propyloxymethyl-3,3-dimethylbutanoate, propyl 2-propyloxymethyl-3,3-dimethylbutanoate, butyl 2-propyloxymethyl-3,3-dimethylbutanoate, pentyl 2-propyloxymethyl-3,3-dimethylbutanoate, hexyl 2-propyloxymethyl-3,3-dimethylbutanoate, octyl 2-propyloxymethyl-3,3-dimethylbutanoate, methyl 3-propyloxy-2-phenylpropionate, ethyl 3-propyloxy-2-phenylpropionate, propyl 3-propyloxy-2-phenylpropionate, butyl 3-propyloxy-2-phenylpropionate, pentyl 3-propyloxy-2-phenylpropionate, hexyl 3-propyloxy-2-phenylpropionate, octyl 3-propyloxy-2-phenylpropionate, methyl 2-methoxybenzenecarboxylate, ethyl 2-methoxybenzenecarboxylate, propyl 2-methoxybenzenecarboxylate, butyl 2-methoxybenzenecarboxylate, pentyl 2-methoxybenzenecarboxylate, hexyl 2-methoxybenzenecarboxylate, octyl 2-methoxybenzenecarboxylate, methyl 2-ethoxybenzenecarboxylate, ethyl 2-ethoxybenzenecarboxylate, propyl 2-ethoxybenzenecarboxylate, butyl 2-ethoxybenzenecarboxylate, pentyl 2-ethoxybenzenecarboxylate, hexyl 2-ethoxybenzenecarboxylate, and octyl 2-ethoxybenzenecarboxylate.

Specific examples of the ether compounds include 1,2-dimethoxypropane, 1,2-diethoxypropane, 1,2-dipropyloxypropane, 1,2-dibutoxypropane, 1,2-di-tert-butoxypropane, 1,2-diphenoxypropane, 1,2-dibenzyloxypropane, 1,2-dimethoxybutane, 1,2-diethoxybutane, 1,2-dipropyloxybutane, 1,2-dibutoxybutane, 1,2-di-tert-butoxybutane, 1,2-diphenoxybutane, 1,2-dibenzyloxybutane, 1,2-dimethoxycyclohexane, 1,2-diethoxycyclohexane, 1,2-dipropyloxycyclohexane, 1,2-dibutoxycyclohexane, 1,2-di-tert-butoxycyclohexane, 1,2-diphenoxycyclohexane, 1,2-dibenzyloxycyclohexane, 1,3-dimethoxypropane, 1,3-diethoxypropane, 1,3-dipropyloxypropane, 1,3-dibutoxypropane, 1,3-di-tert-butoxypropane, 1,3-diphenoxypropane, 1,3-dibenzyloxypropane, 2,4-dimethoxypentane, 2,4-diethoxypentane, 2,4-dipropyloxypentane, 2,4-dibutoxypentane, 2,4-di-tert-butoxypentane, 2,4-diphenoxypentane, 2,4-dibenzyloxypentane, 1,2-dimethoxycyclopentane, 1,2-diethoxycyclopentane, 1,2-dipropyloxycyclopentane, 1,2-dibutoxycyclopentane, 1,2-di-tert-butoxycyclopentane, 1,2-diphenoxycyclopentane, 1,2-dibenzyloxycyclopentane, 9,9-bis(methoxymethyl) fluorene, 9,9-bis(ethoxymethyl) fluorene, 9,9-bis(propyloxymethyl) fluorene, 9,9-bis(butoxymethyl) fluorene, 9,9-bis-tert-butoxymethylfluorene, 9,9-bis(phenoxymethyl) fluorene, 9,9-bis(benzyloxymethyl) fluorene, 1,2-dimethoxybenzene, 1,2-diethoxybenzene, 1,2-dipropyloxybenzene, 1,2-dibutoxybenzene, 1,2-di-tert-butoxybenzene, 1,2-diphenoxybenzene, 1,2-dibenzyloxybenzene, tetrahydrofuran, dibutyl ether, and diethyl ether.

Furthermore, the internal electron donor disclosed in JP-A-2011-246699 can be used as an example.

Particularly, dicarboxylic acid ester compounds, diol diester compounds, and β-alkoxy ester compounds are preferable. For example, the internal electron donor is more preferably a β-alkoxy ester compound and still more preferably ethyl 2-ethoxymethyl-3,3-dimethylbutanoate. One type of the internal electron donor may be used independently, or two or more types thereof may be used in combination.

(d) Organic Acid Halide

As the organic acid halide (d) used in the preparation of the solid catalyst component of the present invention, monovalent or polyvalent carboxylic acid halides are preferably used. Examples of the monovalent or polyvalent carboxylic acid halides include aliphatic carboxylic acid halides, alicyclic carboxylic acid halides, and aromatic carboxylic acid halides. Specific examples of the monovalent or polyvalent carboxylic acid halides include acetyl chloride, propionyl chloride, butyryl chloride, valeryl chloride, acryloyl chloride, methacryloyl chloride, benzoyl chloride, toluoyl chloride, anisoyl chloride, succinyl chloride, malonyl chloride, maleoyl chloride, itaconyl chloride, and phthaloyl chloride.

Among these organic acid halides, aromatic carbonyl chlorides such as benzoyl chloride, toluoyl chloride, and phthaloyl chloride are preferable, aromatic dicarbonyl dichloride is more preferable, and phthaloyl chloride is particularly preferable.

(A) Preparation of Solid Catalyst Component

The solid catalyst component (A) of the present invention is preferably obtained by contact between the precursor of a solid catalyst component (a), the halogenated compound (b), and the internal electron donor (c) or by contact between the precursor of a solid catalyst component (a), the halogenated compound (b), the internal electron donor (c), and the organic acid halide (d). The contact is typically performed under an inert gas atmosphere such as nitrogen or argon.

Specific examples of the contact to obtain the solid catalyst component include:

feeding (b) and (c) into (a) (in any order) to perform the contact;

feeding (b) and (d) into (a) (in any order) to perform the contact;

feeding a mixture of (b), (c), and (d) into (a) to perform the contact;

feeding a mixture of (b) and (c) and feeding (d) into (a) (in any order) to perform the contact;

feeding (c) into (a) to perform the contact, followed by feeding (b) into the resultant to perform the contact;

feeding (c) into (a) to perform the contact, followed by feeding (b) and (c) into the resultant (in any order) to perform the contact;

feeding (c) into (a) to perform the contact, followed by feeding a mixture of (b) and (c) into the resultant to perform the contact;

feeding (a) and (c) into (b) (in any order) to perform the contact;

feeding (a) and (d) into (b) (in any order) to perform the contact; and feeding (a), (c), and (d) into (b) (in any order) to perform the contact. As another example, after any of the above processes, the resultant is brought into contact with (b) one or more times. Alternatively, after any of the above processes, the resultant is brought into contact with a mixture of (b) and (c) one or more times.

Among these examples, preferred examples are feeding (b) and (d) into (a) (in any order) to perform the contact; feeding a mixture of (b) and (c) and feeding (d) into (a) (in any order) to perform the contact; feeding a mixture of (b) and (c) and feeding (d) into (a) (in any order) to perform the contact, followed by feeding a mixture of (b) and (c) to perform the contact one or more times; and feeding (c) into (a) to perform the contact, followed by feeding a mixture of (b) and (c) to perform the contact one or more times. More preferred examples are feeding a mixture of (b) and (c) into (a) and feeding (d) into (a) in this order to perform the contact; feeding a mixture of (b) and (c) into (a) and feeding (d) into (a) in this order to perform the contact, followed by feeding a mixture of (b) and (c) to perform the contact one or more times; and feeding (c) into (a) to perform the contact, followed by bringing a mixture of (b) and (c) into contact with the resultant one or more times. Particularly preferred examples are feeding a mixture of (b) and (c2) into (a) and feeding (d) into (a) in this order to perform the contact, followed by feeding a mixture of (b), (c1), and (c2) into the resultant and then feeding a mixture of (b) and (c2) to perform the contact one or more times; and feeding (c1) into (a) to perform the contact, followed by feeding a mixture of (b), (c1), and (c2) to perform the contact and then feeding a mixture of (b) and (c2) to perform the contact one or more times.

The contact is preferably performed in the presence of a diluent in order to suppress fine powder.

After the contact, a subsequent process may be performed consecutively, but it is preferable to perform washing with a diluent in order to remove a surplus.

Examples of the diluent include aliphatic hydrocarbons such as pentane, hexane, heptane, and octane; aromatic hydrocarbons such as benzene, toluene, and xylene; alicyclic hydrocarbons such as cyclohexane and cyclopentane; and halogenated hydrocarbons such as 1,2-dichloroethane and monochlorobenzene.

An amount of the diluent used for each contact is typically 0.1 ml to 1000 ml per gram of the precursor of a solid catalyst component (a). Preferably, the diluent is used in an amount of 1 ml to 100 ml per gram. An amount of the diluent used for one washing is about the same. The number of times of washing is typically 1 to 5 times for each contact.

The contact and/or the washing is (are) performed at a temperature of typically −50 to 150° C., preferably 0 to 140° C., and more preferably 60 to 135° C.

A contact time is not particularly limited but is preferably 0.5 to eight hours and more preferably one to six hours. A washing time is not limited but preferably 1 to 120 minutes and more preferably 2 to 60 minutes.

An amount of the halogenated compound (b) used is typically 0.5 to 1000 mmol, preferably 1 to 200 mmol, and more preferably 2 to 100 mmol per gram of the precursor of a solid catalyst component (a).

Furthermore, when the halogenated compound (b) is used, it is preferable to use the internal electron donor (c) together. In that case, an amount of (c) used per mole of (b) is typically 1 to 100 mol, preferably 1.5 to 75 mol, and more preferably 2 to 50 mol.

An amount of the internal electron donor (c) used is typically 0.01 to 100 mmol, preferably 0.05 to 50 mmol, and more preferably 0.1 to 20 mmol per gram of the precursor of a solid catalyst component (a).

An amount of the organic acid halide (d) used is typically 0.1 to 100 mmol, preferably 0.3 to 50 mmol, and more preferably 0.5 to 20 mmol per gram of the precursor of a solid catalyst component (a). An amount of the organic acid halide (d) used per mole of magnesium atom in the precursor of a solid catalyst component (a) is typically 0.01 to 1.0 mol and preferably 0.03 to 0.5 mol.

An excessively large amount of (c) or (d) may cause particle disintegration.

In a case where each compound is used for several times to perform the contact, note that the aforementioned amount described for each compound is an amount of one type of compound used at one time.

The obtained solid catalyst component may be used for polymerization in a slurry state in combination with an inert diluent or may be used for polymerization as a flowable powder obtained by drying. Examples of the drying include a method for removing volatile components in vacuo and a method for removing volatile components under a flow of an inert gas such as nitrogen or argon. A drying temperature is preferably 0 to 200° C. and more preferably 50 to 100° C. A drying time is preferably 0.01 to 20 hours and more preferably 0.5 to 10 hours.

In obtaining the precursor of a solid catalyst component (a) and in obtaining the solid catalyst component for olefin polymerization (A), the number of revolutions per second n (rps) of a stirrer blade is not particularly limited, but the stirrer blade rotates at a speed of, for example, 0.2 rps to 170 rps. The stirrer blade is not particularly limited in diameter (m) but has a diameter of, for example, 0.01 m to 1 m. The stirrer blade is not particularly limited in form but has the form of, for example, paddle, propeller, turbine, or anchor.

With regard to a reaction vessel used in obtaining the precursor of a solid catalyst component (a) and in obtaining the solid catalyst component for olefin polymerization (A), the reaction vessel is not particularly limited in form but has, for example, a cylindrical shape with a round bottom (or a dish bottom) or an elliptical cylindrical shape with an elliptical bottom. The reaction vessel may be provided with a baffle. The baffle is not particularly limited in form but may have, for example, one to six flat plates. A ratio D of a diameter of the reaction vessel to the diameter of the stirrer blade is not particularly limited but is for example, 1.05 to 3.00 and preferably 1.10 to 2.00. A ratio W of a width of the stirrer blade to the diameter of the stirrer blade is not particularly limited but is, for example, 0.03 to 2.50, preferably 0.08 to 1.20, and more preferably 0.09 to 0.50. A feeding speed VF of the organomagnesium compound (a3) is not particularly limited and is, for example, 0.000001 to 10 mol/s and preferably 0.00001 to 1 mol/s.

For an example, an amount of titanium atom contained in the solid catalyst component for olefin polymerization is typically 0.1 to 10 wt % and preferably 0.5 to 5.0 wt %.

For example, an amount of internal electron donor contained in the solid catalyst component for olefin polymerization is typically 1 to 50 wt % and preferably 5 to 40 wt %.

For example, an amount of alkoxy group contained in the solid catalyst component for olefin polymerization is typically 10 wt % or less and preferably 5 wt % or less.

<Catalyst for Olefin Polymerization>

In an embodiment, a catalyst for olefin polymerization can be produced, for example, when the solid catalyst component for olefin polymerization according to the present invention is brought into contact with an organoaluminum compound by a known method. In another embodiment, a catalyst for olefin polymerization can be produced when the solid catalyst component for olefin polymerization according to the present invention is brought into contact with an organoaluminum compound and an external electron donor.

Therefore, a catalyst for olefin polymerization according to an embodiment of the present invention contains the solid catalyst component for olefin polymerization according to the present invention and an organoaluminum compound. Furthermore, a catalyst for olefin polymerization according to another embodiment of the present invention contains the solid catalyst component for olefin polymerization according to the present invention, an organoaluminum compound, and an external electron donor.

The organoaluminum compound used in the present invention is a compound having one or more carbon-aluminum bonds, and specific examples thereof include the compounds disclosed in JP-A-10-212319. Particularly, trialkylaluminum, a mixture of trialkylaluminum and dialkylaluminum halide, or alkylalumoxane is preferable, and triethylaluminum, triiso-butylaluminum, trihexylaluminum, trioctylaluminum, diethylaluminum chloride, a mixture of triethylaluminum and diethylaluminum chloride, or tetraethyldialumoxane is more preferable.

Examples of the external electron donor used in the present invention include the compounds disclosed in JP-B-2950168, JP-A-2006-96936, JP-A-2009-173870, and JP-A-2010-168545. Particularly, preferred examples are oxygen-containing compounds or nitrogen-containing compounds. Examples of the oxygen-containing compounds include alkoxy silicones, ethers, esters, and ketones. Among these examples, preferred examples are alkoxy silicones or ethers.

An alkoxy silicone as the external electron donor is preferably a compound represented by any of the following Formulae (iv) to (vii).

  (iv)

  (v)

$$Si(OR^4)_3(NR^7) \quad (vi)$$

$$Si(OR^4)_2(NR^7)_2 \quad (vii)$$

[In Formulae, $R^2$ is a $C_{1-20}$ hydrocarbyl group or a hydrogen atom; $R^3$ is a $C_{1-20}$ hydrocarbyl group; and h is an integer satisfying 0≤h≤4. When one or both of $R^2$ and $R^3$ present in plural, the plurality of $R^2$ and $R^3$ may be the same or different. $R^4$ is a $C_{1-6}$ hydrocarbyl group; $R^5$ and $R^6$ are hydrogen atoms or $C_{1-12}$ hydrocarbyl groups; and $NR^7$ is a $C_{5-20}$ cyclic amino group.]

Examples of the hydrocarbyl groups as $R^2$ and $R^3$ in Formula (iv) include alkyl, aralkyl, aryl, and alkenyl groups. Examples of the alkyl groups as $R^2$ and $R^3$ include linear alkyl groups such as methyl, ethyl, n-propyl, n-butyl, n-pentyl, n-hexyl, n-heptyl, and n-octyl groups; branched alkyl groups such as iso-propyl, iso-butyl, tert-butyl, iso-pentyl, neopentyl, and 2-ethylhexyl groups; and cyclic alkyl groups such as cyclopropyl, cyclobutyl, cyclopentyl, cyclohexyl, cycloheptyl, and cyclooctyl groups. Preferred examples are $C_{1-20}$ linear, branched, or cyclic alkyl groups. Examples of the aralkyl groups as $R^2$ and $R^3$ include benzyl and phenethyl groups. Preferred examples are $C_{7-20}$ aralkyl groups. Examples of the aryl group as $R^2$ and $R^3$ include phenyl, tolyl, and xylyl groups. Preferred examples are $C_{6-20}$ aryl groups. Examples of the alkenyl groups as $R^2$ and $R^3$ include linear alkenyl groups such as vinyl, allyl, 3-butenyl, and 5-hexenyl groups; branched alkenyl groups such as iso-butenyl and 5-methyl-3-pentenyl group; and cyclic alkenyl groups such as 2-cyclohexenyl and 3-cyclohexenyl groups. Preferred examples are $C_{2-10}$ alkenyl groups.

Specific examples of the alkoxy silicone represented by Formula (iv) include cyclohexylmethyldimethoxysilane, cyclohexylethyldimethoxysilane, diiso-propyldimethoxysilane, tert-butylethyldimethoxysilane, tert-butyl-n-propyldimethoxysilane, phenyltrimethoxysilane, diphenyldimethoxysilane, dicyclobutyldimethoxysilane, dicyclopentyldimethoxysilane, dicyclohexyldimethoxysilane, tetraethoxysilane, methyltriethoxysilane, ethyltriethoxysilane, iso-butyltriethoxysilane, vinyltriethoxysilane, sec-butyltriethoxysilane, cyclohexyltriethoxysilane, and cyclopentyltriethoxysilane.

Examples of the hydrocarbyl group as $R^4$ in Formulae (v), (vi), and (vii) include alkyl and alkenyl groups. Examples of the alkyl group as $R^4$ include linear alkyl groups such as methyl, ethyl, n-propyl, n-butyl, n-pentyl, and n-hexyl groups; branched alkyl groups such as iso-propyl, iso-butyl, tert-butyl, iso-pentyl, and neopentyl groups; and cyclic alkyl groups such as cyclopropyl, cyclobutyl, cyclopentyl, and cyclohexyl groups. Preferred examples are $C_{1-6}$ linear alkyl groups. Examples of the alkenyl group as $R^4$ include linear alkenyl groups such as vinyl, allyl, 3-butenyl, and 5-hexenyl groups; branched alkenyl groups such as iso-butenyl and 5-methyl-3-pentenyl groups; and cyclic alkenyl groups such as 2-cyclohexenyl and 3-cyclohexenyl groups. Preferred examples are $C_{2-6}$ linear alkenyl groups, and particularly preferred examples are methyl and ethyl groups.

Examples of the hydrocarbyl groups as $R^5$ and $R^6$ in Formula (v) include alkyl and alkenyl groups. Examples of the alkyl group as $R^5$ and $R^6$ include linear alkyl groups such as methyl, ethyl, n-propyl, n-butyl, n-pentyl, and n-hexyl groups; branched alkyl groups such as iso-propyl, iso-butyl, tert-butyl, iso-pentyl, and neopentyl groups; and cyclic alkyl groups such as cyclopropyl, cyclobutyl, cyclopentyl, and cyclohexyl groups. Preferred examples are $C_{1-6}$ linear alkyl groups. Examples of the alkenyl groups as $R^5$ and $R^6$ include linear alkenyl groups such as vinyl, allyl, 3-butenyl, and 5-hexenyl groups; branched alkenyl groups such as iso-butenyl and 5-methyl-3-pentenyl groups; and cyclic alkenyl groups such as 2-cyclohexenyl and 3-cyclohexenyl groups. Preferred examples are $C_{2-6}$ linear alkenyl groups, and particularly preferred examples are methyl and ethyl groups.

Specific examples of the alkoxy silicone represented by Formula (v) include dimethylaminotrimethoxysilane, diethylaminotrimethoxysilane, di-n-propylaminotrimethoxysilane, dimethylaminotriethoxysilane, diethylaminotriethoxysilane, di-n-propylaminotriethoxysilane, methylethylaminotriethoxysilane, methyl-n-propylaminotriethoxysilane, tert-butylaminotriethoxysilane, diiso-propylaminotriethoxysilane, and methyl iso-propylaminotriethoxysilane.

Examples of the cyclic amino group as $NR^7$ in Formulae (vi) and (vii) include perhydroquinolino, perhydroisoquinolino, 1,2,3,4-tetrahydroquinolino, 1,2,3,4-tetrahydroisoquinolino, and octamethyleneimino groups.

Specific examples of the alkoxy silicone represented by Formulae (vi) and (vii) include perhydroquinolinotriethoxysilane, perhydroisoquinolinotriethoxysilane, 1,2,3,4-tetrahydroquinolinotriethoxysilane, 1,2,3,4-tetrahydroisoquinolinotriethoxysilane, and octamethyleneiminotriethoxysilane.

An ether as the external electron donor is preferably a cyclic ether compound. The cyclic ether compound is a heterocyclic compound having at least one —C—O—C— bond in the ring structure and more preferably at least one —C—O—C—O—C— bond in the ring structure. Particularly, 1,3-dioxolane or 1,3-dioxane is preferable.

One type of the external electron donor may be used independently, or two or more types thereof may be used in combination.

A method for bringing the solid catalyst component for olefin polymerization into contact with the organoaluminum compound and the external electron donor is not particularly limited as long as the method produces a catalyst for olefin polymerization. The contact is carried out in the presence or absence of a solvent. A contacted mixture of these compounds may be fed into a polymerization vessel, or each component may be separately fed into a polymerization vessel and brought into contact with each other in the polymerization vessel. Alternatively, a contacted mixture of any two components and the remaining components may be fed separately to a polymerization vessel and brought into contact with each other in the polymerization vessel.

An amount of the organoaluminum compound used is typically 0.01 to 1000 μmol and preferably 0.1 to 500 μmol per milligram of the solid catalyst component for olefin polymerization.

An amount of the external electron donor used is typically 0.0001 to 1000 μmol, preferably 0.001 to 500 μmol, and more preferably 0.01 to 150 μmol per milligram of the solid catalyst component for olefin polymerization.

<Olefin-Based Polymer>

An olefin-based polymer according to the present invention has an envelope E2 calculated by the following Formula (3) in a range of 0.820 to 0.885.

$$E2=LE2/LS2 \quad (3)$$

(In Formula, LE2 is a convex hull perimeter of the olefin-based polymer obtained from an image of the olefin-based polymer captured with a scanning electron microscope, and LS2 is an actual perimeter of the olefin-based polymer obtained from the image of the olefin-based polymer captured with the scanning electron microscope.)

In the olefin-based polymer according to the present invention, an amount of decrease in bulk density due to heat (ΔBD) is preferably in a range of −0.012 to −0.000. The amount of decrease in bulk density is calculated by the following Formula (4).

$$\Delta BD = (\text{bulk density at } 60° \text{ C.}) - (\text{bulk density at room temperature}) \quad (4)$$

<Method for Producing Olefin-Based Polymer>

A method for producing an olefin-based polymer according to the present invention involves olefin polymerization in the presence of the catalyst for olefin polymerization according to the present invention.

Examples of the olefin include ethylene and α-olefins having 3 or more carbon atoms. Examples of the α-olefins include linear monoolefins such as propylene, 1-butene, 1-pentene, 1-hexene, 1-heptene, 1-octene, and 1-decene; branched monoolefins such as 3-methyl-1-butene, 3-methyl-1-pentene, and 4-methyl-1-pentene; cyclic monoolefins such as vinylcyclohexane; and combinations of two or more of these examples. Particularly, the olefin is preferably a homopolymer of ethylene or propylene or a copolymer of a plurality of types of olefins containing ethylene or propylene as the main components. The combination of the plurality of types of olefins may be a combination of two or more types of olefins or a combination of an olefin and a compound having a polyunsaturated bond such as a conjugated diene or an unconjugated diene. It is particularly preferable that the olefin contains at least one component selected from propylene, ethylene, and 1-butene.

An olefin-based polymer produced by the method for producing an olefin-based polymer according to the present invention is preferably an ethylene homopolymer, a propylene homopolymer, a 1-butene homopolymer, a 1-pentene homopolymer, a 1-hexene homopolymer, an ethylene-propylene copolymer, an ethylene-1-butene copolymer, an ethylene-1-hexene copolymer, a propylene-1-butene copolymer, a propylene-1-hexene copolymer, an ethylene-propylene-1-butene copolymer, an ethylene-propylene-1-hexene copolymer, or a polymer obtained by multi-step polymerization of these polymers.

In some cases, a method for forming the catalyst for olefin polymerization according to an embodiment of the present invention preferably involves the following steps:

(i) in the presence of the solid catalyst component for olefin polymerization and the organoaluminum compound, a small amount of olefin (the same or different from one used in primary polymerization (typically referred to as main polymerization)) is polymerized (note that a chain transfer agent such as hydrogen or an external electron donor may be used to adjust a molecular weight of the resulting olefin-based polymer) to produce a catalyst component having a surface covered with a polymer of the olefin (note that this polymerization is typically referred to as prepolymerization, and therefore, the catalyst component is typically referred to as prepolymerized catalyst component); and (ii) the prepolymerized catalyst component is brought into contact with the organoaluminum compound and the external electron donor.

The prepolymerization is preferably slurry polymerization using inert hydrocarbons such as propane, butane, isobutane, pentane, isopentane, hexane, heptane, octane, cyclohexane, benzene, and toluene as solvents.

An amount of the organoaluminum compound used in Step (i) is typically 0.5 mol to 700 mol, preferably 0.8 mol to 500 mol, particularly preferably 1 mol to 200 mol, per mole of the titanium atom in the solid catalyst component used in Step (i).

An amount of the olefin to be prepolymerized is typically 0.01 g to 1000 g, preferably 0.05 g to 500 g, particularly preferably 0.1 g to 200 g per 1 g of the solid catalyst component for olefin polymerization used in Step (i).

A slurry concentration of the solid catalyst component for olefin polymerization in the slurry polymerization of Step (i) is preferably 1 to 500 g (solid catalyst component for olefin polymerization)/liter (solvent), particularly preferably 3 to 300 g (solid catalyst component for olefin polymerization)/liter (solvent).

The prepolymerization is performed at a temperature of preferably −20° C. to 100° C. and particularly preferably 0° C. to 80° C. During the prepolymerization, the olefin in the gas phase preferably has a partial pressure of 0.01 MPa to 2 MPa and particularly preferably 0.1 MPa to 1 MPa. However, these ranges do not apply to olefins which are in liquid form at the pressure and temperature of the prepolymerization. A prepolymerization time is preferably two minutes to 72 hours.

In the prepolymerization, for example, the solid catalyst component, the organoaluminum compound, and the olefin are fed into the polymerization vessel by (1) feeding the solid catalyst component and the organoaluminum compound, and then, the olefin or (2) feeding the solid catalyst component and the olefin, and then, the organoaluminum compound. The olefin is fed into the polymerization vessel, for example, by (1) sequentially feeding the olefin in such a manner that the pressure inside the polymerization vessel is maintained at a predetermined level or (2) collectively feeding a predetermined total amount of the olefin. In order to adjust a molecular weight of the olefin-based polymer obtained by the prepolymerization, a chain transfer agent such as hydrogen may be used.

In the prepolymerization, a part or all of an electron donating compound (C) used in the main polymerization may be used as necessary. An amount of the electron donating compound used in the prepolymerization is typically 0.01 to 400 mol, preferably 0.02 to 200 mol, and particularly preferably 0.03 to 100 mol per mole of the titanium atom contained in the solid catalyst component, and an amount of the electron donating compound is typically 0.003 to 5 mol, preferably 0.005 to 3 mol, and particularly preferably 0.01 to 2 mol per mole of the organoaluminum compound.

In the prepolymerization, a method for feeding the electron donating compound to the polymerization vessel is not particularly limited. Examples of the method include (1) feeding only the electron donating compound, and (2) feeding a contacted product of the electron donating compound and the organoaluminum compound. The olefin used in the prepolymerization may be the same as or different from one used in the main polymerization.

Examples of the main polymerization include: (1) polymerizing the olefin in the presence of a catalyst obtained by contacting the solid catalyst component, the organoaluminum compound, and the electron donating compound; (2) polymerizing the olefin in the presence of a prepolymerized catalyst; and (3) polymerizing the olefin in the presence of a contacted product of the prepolymerized catalyst, the organoaluminum compound, and the electron donating compound.

An amount of the organoaluminum compound used in the main polymerization is typically 1 to 1000 mol and preferably 5 to 600 mol per mole of the titanium atom in the solid catalyst component.

An amount of the electron donating compound used in the main polymerization is typically 0.1 to 2000 mol, preferably 0.3 to 1000 mol, and particularly preferably 0.5 to 800 mol per mole of the titanium atom contained in the solid catalyst component, and an amount of the electron donating compound is typically 0.001 to 5 mol, preferably 0.005 to 3 mol, and particularly preferably 0.01 to 1 mol per mole of the organoaluminum compound.

The main polymerization is performed at a temperature of typically −30 to 300° C., preferably 20 to 180° C., and more preferably 50 to 95° C. A polymerization pressure is not particularly limited and is generally normal pressure to 100 kg/cm² and preferably about 2 to 50 kg/cm² from viewpoints of industrial and economic efficiencies. The polymerization may be of batch type or continuous type. Examples of the polymerization include slurry polymerization using an inert hydrocarbon solvent such as propane, butane, isobutane, pentane, hexane, heptane, and octane; solution polymerization using the solvent; bulk polymerization using an olefin in liquid form at a polymerization temperature as a medium; and gas phase polymerization. Particularly, the main polymerization is preferably gas phase polymerization from a viewpoint of obtaining good powder properties.

Furthermore, from viewpoints of improving the powder properties, improving the polymer properties, and controlling the polymerization activity, it is preferable to perform the main polymerization by adding a polymerization activity inhibitor into the polymerization system.

The polymerization activity inhibitor used herein is a compound having an effect of reducing the polymerization activity of the catalyst in the main polymerization. Examples of the polymerization activity inhibitor include electron donating compounds such as alkoxysilanes, esters, and ethers; active hydrogen compounds such as alcohols and water; and oxygen-containing compounds which are gases at normal temperature and normal pressure such as oxygen, carbon monoxide, and carbon dioxide. It is preferable to use one or more of these compounds. Among these examples, it is preferable to use tetraethoxysilane, tetramethoxysilane, methanol, ethanol, propanol, butanol, oxygen, or carbon monoxide, and it is particularly preferable to use tetraethoxysilane, ethanol, or oxygen.

The polymerization activity inhibitor is added to the polymerization system during the main polymerization. It is considered that the aforementioned effects of improvement are seen by contact between the polymerization activity inhibitor and polymer particles in the polymerization system. The addition may be of batch type or continuous type. The timing of addition may be at the start of the main polymerization or immediately before the end of the prepolymerization. The polymerization activity inhibitor may be used as it is or may be diluted with an inert hydrocarbon solvent or the like.

In the main polymerization, a chain transfer agent such as hydrogen may be used in order to adjust a molecular weight of the resulting olefin-based polymer.

EXAMPLES

Hereinafter, the present invention will be described more specifically with reference to Examples and Comparative Examples, but the present invention is not limited to the following Examples.

<Envelope of Solid Catalyst Component for Olefin Polymerization (or Olefin-Based Polymer)>

A solid catalyst component for olefin polymerization (or an olefin-based polymer) was placed on a smooth plane with a conductive double-sided tape, and then carbon was deposited on the solid catalyst component for olefin polymerization (or the olefin-based polymer) with a carbon deposition system (manufactured by Vaccum Device Corporation, VE-2030). Then, a planar image was acquired with a scanning electron microscope (manufactured by Hitachi, Ltd., FE-SEM) from a direction perpendicular to the plane in which the solid catalyst component for olefin polymerization (or the olefin-based polymer) was placed.

For the solid catalyst component for olefin polymerization, the scanning electron microscope conditions were set at an acceleration voltage of 8 kV and an observation magnification of 1300× to 7000× in such a manner that the convex hull perimeter of the solid catalyst component for olefin polymerization in the planar image was 1470 to 3020 pixels. Under these conditions, the pixel size was 0.014 to 0.076 μm/pixel.

For the olefin polymer, the scanning electron microscope conditions were set at an acceleration voltage of 8 kV and an observation magnification of 40× to 110× in such a manner that the convex hull perimeter of the olefin polymer in the planar image was 1655 to 5586 pixels. Under these conditions, the pixel size was 0.45 to 2.48 μm/pixel.

Next, based on the image of the solid catalyst component for olefin polymerization (or the image of the olefin-based polymer), a convex hull perimeter and an actual perimeter thereof were measured with an image analyzer NS2K-Pro 8.23 (manufactured by Nanosystem Corporation), thereby calculating an envelope E1 of the solid catalyst component for olefin polymerization (or an envelope E2 of the olefin-based polymer) by the above Formulae (1) and (3) (envelope=convex hull perimeter/actual perimeter). The solid catalyst component for olefin polymerization captured with the scanning electron microscope is actually an aggregate of small solid catalyst components for olefin polymerization.

Figure 5:
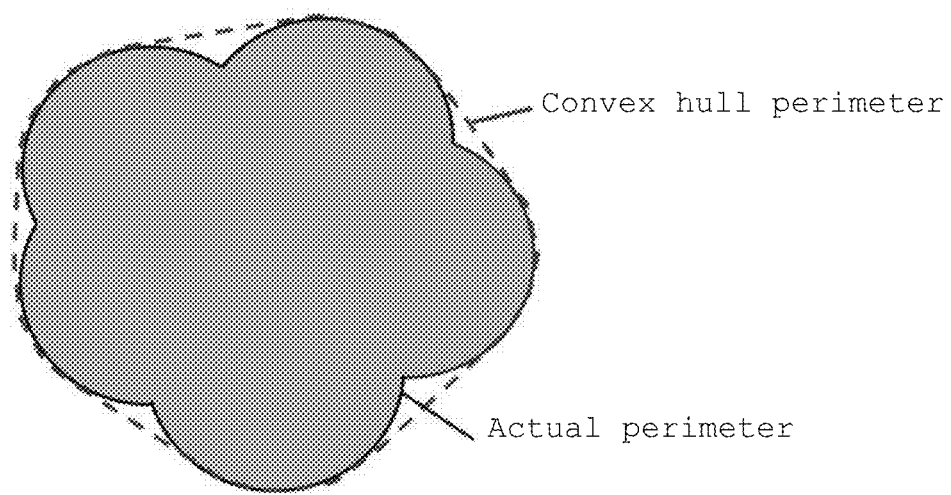
FIG. 5 shows an exemplary solid component for olefin polymerization.

For example, in the solid catalyst component for olefin polymerization (or olefin-based polymer) shown in FIG. 5, the "convex hull perimeter" indicates a length of the periphery when vertices are connected at the shortest distance as shown by the dash line. The "actual perimeter" indicates a length of the contour as indicated by the solid line.

In this Example, the convex hull perimeters and the actual perimeters of thirty particles of the solid catalyst components for olefin polymerization (or olefin-based polymer) were measured, and envelopes were calculated, thereby obtaining the average thereof. Thirty particles of the solid catalyst component for olefin polymerization were selected from those having a particle diameter of 10 to 70 μm. Thirty particles of the olefin-based polymer were selected from those having a particle diameter of 100 to 3000 μm.

<Method for Obtaining Convex Hull Perimeter>

Figure 6:
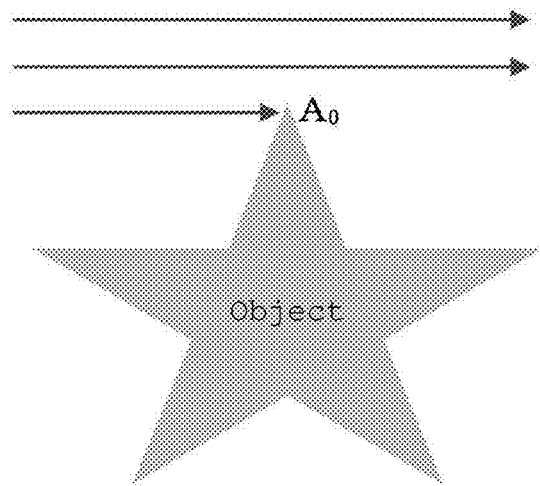
FIGS. 6-8 show steps of a method for obtaining convex hull perimeter.

(1) Find a point $A_0$ where the scan line of a camera first touches an object as shown in FIG. 6.

Figure 7:
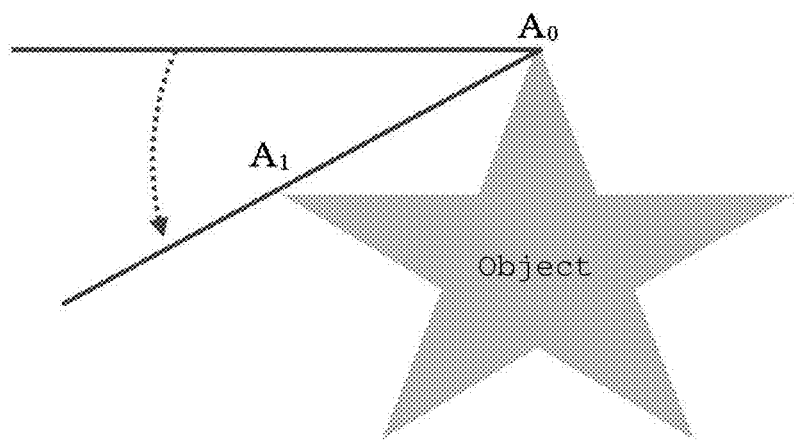

(2) Rotate a straight line extending from the point $A_0$ in the horizontal direction and find a point $A_1$ where the straight line touches the object as shown in FIG. 7.

Figure 8:
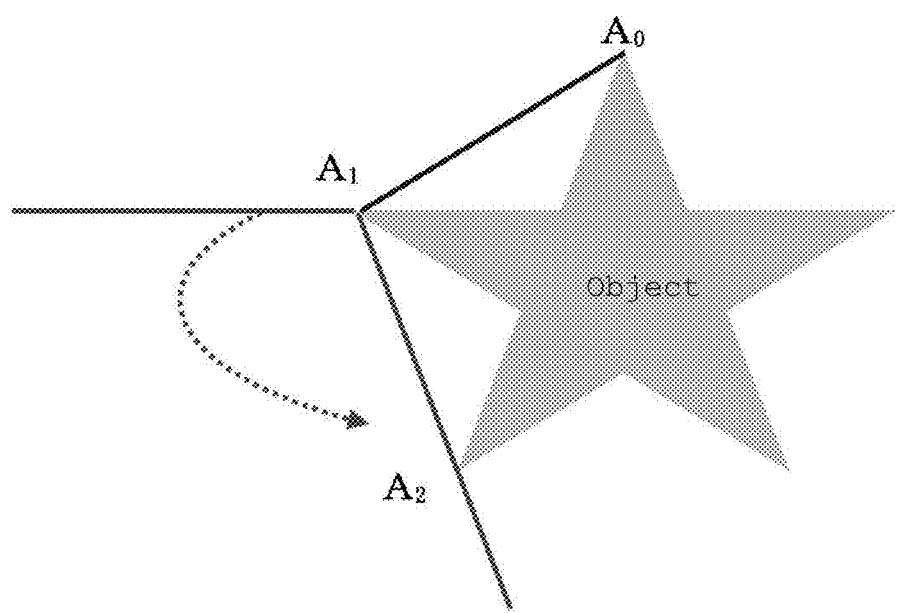

(3) Similarly, rotate a straight line extending from the point $A_1$ in the horizontal direction and find a point $A_2$ where the straight line touches the object as shown in FIG. 8.

(4) Repeat the process until a straight line meets the point $A_0$ and define the total length of each straight line as convex hull perimeter.

$$\text{Convex hull perimeter} = \text{length } A_0A_1 + \text{length } A_1A_2 + \text{length } A_2A_3 \ldots \text{length } A_nA_0$$

<Measurement of Amount of Ti Atom Contained in Solid Catalyst Component for Olefin Polymerization (Unit: wt %)>

The measurement was performed by the hydrogen peroxide process described in Jikken Kagaku Koza (Encyclopedia of Experimental Chemistry) 4th Ed. vol. 15, p. 233 (edited by The Chemical Society of Japan). The solid catalyst component for olefin polymerization was decomposed with dilute sulfuric acid. After that, excess hydrogen peroxide water was added to prepare a sample. The absorbance of the prepared sample at a wavelength of 410 nm was measured with a double beam spectrophotometer U-2001 (manufactured by Hitachi, Ltd.). An amount of Ti atom contained in the solid catalyst component for olefin polymerization was determined based on the calibration curve.

<Measurement of Amount of Phthalate Ester Component Contained in Solid Catalyst Component for Olefin Polymerization (Unit: wt %)>

A solid catalyst component for olefin polymerization was dissolved in N,N-dimethylacetamide to prepare a sample. The prepared sample was measured with GC-2014 (manufactured by Shimadzu Corporation) by a gas chromatography internal standard method (according to JIS K 0114: 2012). Based on the found value, an amount of the phthalate ester component contained in the solid catalyst component for olefin polymerization was determined.

<Specific Surface Area of Solid Catalyst Component for Olefin Polymerization (Unit: $m^2/g$)>

A specific surface area of the solid catalyst component for olefin polymerization was determined by BET with BEL-SORP-mini 2 manufactured by MicrotracBEL based on amounts of adsorption and desorption of nitrogen.

<Limiting Viscosity [η] T of Olefin-Based Polymer (Unit: dl/g)>

Three types of tetralin solutions of the olefin-based polymer (with concentrations of 0.1 g/dl, 0.2 g/dl, and 0.5 g/dl) were prepared. After that, a reduced viscosity of each tetralin solution was measured at 135° C. with an Ubbelohde viscometer. A limiting viscosity of the olefin-based polymer was determined by the calculation method, or extrapolation method, described in "Kobunshi Youeki, Koubunshi Jikkengaku 11 (Polymer Solution, Polymer Experiment 11)" p. 491 (published by Kyoritsu Shuppan Co., Ltd., 1982). In the extrapolation method, a reduced viscosity of each solution was plotted against a concentration thereof, and the concentration was extrapolated to zero.

<Amount of Copolymer Component Contained in Olefin-Based Polymer (Unit: wt %)>

Heats of fusion (unit: J/g) of the olefin-based polymer at 151° C. or higher were measured with a differential scanning calorimeter (DSC). A sample of the olefin-based polymer (5 mg) was filled in an aluminum pan and placed in a differential scanning calorimeter DSC8500 (manufactured by PerkinElmer, Inc.). A temperature of the sample was raised to 230° C., held at 230° C. for five minutes, lowered to 0° C. at 5° C./min, held at 0° C. for five minutes, and then, raised to 200° C. at 5° C./min, thereby measuring a melting curve. The temperature was corrected based on the melting point of indium, that is, 156.6° C. The heats of fusion were calculated from the melting peak area at 151° C. or higher in the melting curve. After that, an amount of copolymer component was determined by the following Formula (5).

Amount of copolymer component=100−(heat of fusion at 151° C. or higher)×0.91 (5)

<Amounts of Ethylene Monomer Unit and 1-Butene Monomer Unit Contained in Olefin-Based Polymer (Unit: wt %)>

In a test tube of 10 mm Φ, an olefin-based polymer (200 mg) was dissolved in ortho-dichlorobenzene (3 mL) to prepare a sample. A 13C-NMR spectrum of the prepared sample was measured. The following conditions were set for the measurement of the 13C-NMR spectrum.

Measurement temperature: 135° C.
Pulse repetition time: 10 seconds
Pulse width: 45 degrees
Number of integrations: 2500 times Based on the obtained 13C-NMR spectrum, amounts of ethylene monomer unit and 1-butene monomer unit contained in the olefin-based polymer were determined according to the method described in the report by Cheng et al. (Macromolecules, No. 24, 1991, pp. 4813 to 4819).

<Amount of Decrease in Bulk Density of Olefin-Based Polymer Due to Heat (Unit: $g/cm^3$)>

Bulk densities of the olefin-based polymer were measured at room temperature (20 to 25° C.) and at 60° C. according to ISO 60:1977. Then, an amount of decrease in bulk density due to heat (hereinafter also referred to as "ΔBD") was calculated by the following Formula (4).

ΔBD=(bulk density at 60° C.)−(bulk density at room temperature) (4)

Example 1

Solid Catalyst Component for Olefin Polymerization 1

(1) Synthesis of Precursor of Solid Catalyst Component 1

A gas inside a cylindrical reactor equipped with a stirrer and four baffles was replaced with nitrogen gas. After that, hexane (803 L), diisobutyl phthalate (6.8 kg), tetraethoxysilane (350 kg), and tetrabutoxytitanium (39 kg) were added and stirred. To the resulting mixture, a dibutyl ether solution of butylmagnesium chloride (concentration: 2.2 mol/L, 760 kg) was added in a dropwise manner over five hours while the temperature of the mixture was maintained at 7° C. Q at this time was 0.25. The resulting mixture was stirred at 20° C. for one hour. After that, toluene (503 L) was added, thereby filtering the mixture. The obtained solid was washed with toluene (1102 L) three times, and then, toluene (405 L) was added to obtain a slurry of a precursor of a solid catalyst component 1.

(2) Synthesis of Solid Catalyst Component for Olefin Polymerization 1

A gas inside a cylindrical reactor equipped with a stirrer and four baffles was replaced with nitrogen gas. After that, the slurry of the precursor of a solid catalyst component 1 obtained in (1) was transferred using toluene (300 L). While the obtained transferred substance was stirred, a mixed solution of tetrachlorotitanium (883 kg) and dibutyl ether (20 kg) was added to the transferred substance. Next, a toluene solution of o-phthaloyl chloride (concentration: 80 vol %, 80 kg) was added to the mixture. While the temperature of the resulting mixture was maintained at 110° C., the mixture was stirred for five hours, and then, filtered. The resultant was washed with toluene (1103 L) three times while the temperature inside the reactor was maintained at 110° C., and then, toluene (488 L) was added to obtain a slurry.

While the obtained slurry was stirred, a mixed solution of tetrachlorotitanium (376 kg), dibutyl ether (20 kg), and diisobutyl phthalate (17 kg) was added to the slurry. While the temperature of the resulting mixture was maintained at 105° C., the mixture was stirred for one hour, and then, filtered. The resultant was washed with toluene (1103 L) two times while the temperature inside the reactor was maintained at 105° C., and then, toluene (515 L) was added to obtain a slurry.

While the obtained slurry was stirred, a mixed solution of tetrachlorotitanium (375 kg) and dibutyl ether (20 kg) was added to the slurry. While the temperature of the resulting mixture was maintained at 105° C., the mixture was stirred for one hour, and then, filtered. The resultant was washed with toluene (1103 L) two times while the temperature inside the reactor was maintained at 110° C., and then, toluene (536 L) was added to obtain a slurry.

While the obtained slurry was stirred, a mixed solution of tetrachlorotitanium (375 kg) and dibutyl ether (20 kg) was added to the slurry. While the temperature of the resulting mixture was maintained at 105° C., the mixture was stirred for one hour, and then, filtered. The washing with toluene (1103 L) was performed six times while the temperature inside the reactor was maintained at 105° C. Next, the washing with hexane (1002 L) was performed four times. Then, the resultant was dried to yield a solid catalyst component for olefin polymerization 1.

The obtained solid catalyst component for olefin polymerization 1 had LE1 of 122 μm (2239 pixels), LS1 of 141 μm (2581 pixels), E1 of 0.868, Ti atom in an amount of 1.6 wt %, and phthalate ester component in an amount of 10.5 wt %.

(3) Synthesis of Olefin-Based Polymer 1

The inside of a stainless steel autoclave having an interior volume of 3 L and equipped with a stirrer (hereinafter referred to as an "autoclave 1") was dried in vacuo, and a gas inside the autoclave 1 was replaced with argon gas and cooled. After that, the inside of the autoclave 1 was evacuated.

In a glass charger, heptane, triethylaluminum (2.6 mmol), cyclohexylethyldimethoxysilane (CHEDMS) (0.26 mmol) and the solid catalyst component for olefin polymerization 1 (33 mg) obtained in (2) were brought into contact with each other. The resulting contacted product was fed into the autoclave 1. Next, liquefied propylene (50 g) and liquefied butane (400 g) were fed into the autoclave 1, followed by feeding hydrogen gas (partial pressure: 0.007 MPa) into the autoclave 1. Then, the temperature inside the autoclave 1 was raised to 60° C. to start polymerization. After 20 minutes from the start of polymerization, unreacted propylene and butane were purged to the outside of the polymerization system, and the inside of the autoclave 1 was dried in vacuo. Next, triethylaluminum (2.6 mmol) was fed into the autoclave 1 under pressure, followed by feeding hydrogen gas (partial pressure: 0.004 MPa) into the autoclave 1.

After the autoclave 1 and an autoclave having an internal volume of 3 L (hereinafter referred to as "autoclave 2") were connected, the inside of the autoclave 2 was evacuated. Next, propylene (450 g), ethylene (20 g), and 1-butene (60 g) were fed into the autoclave 2. Next, the temperature inside the autoclave 2 was raised to 70° C., and the obtained mixed gas was continuously fed into the autoclave 1 to perform polymerization for 150 minutes at a pressure of 0.8 MPa. Then, the gas inside the autoclave 1 was purged to terminate the polymerization. The produced olefin-based polymer was dried in vacuo at 70° C. for one hour to yield an olefin-based polymer 1 (172 g).

The obtained olefin-based polymer 1 had LE2 of 2358 μm (2175 pixels), LS2 of 2728 μm (2519 pixels), E2 of 0.864, and a limiting viscosity [η] T of 1.52 dl/g. An amount of copolymer component in the obtained olefin-based polymer 1 was 86 wt %. In addition, an amount of ethylene monomer unit contained in the copolymer component was 3.8 wt %, and an amount of 1-butene monomer unit was 6.3 wt %.

Example 2

Solid Catalyst Component for Olefin Polymerization 2

(1) Synthesis of Precursor of Solid Catalyst Component 2

A gas inside a cylindrical reactor equipped with a stirrer and four baffles was replaced with nitrogen gas. After that, hexane (1243 L), tetraethoxysilane (350 kg), and tetrabutoxytitanium (39 kg) were added and stirred. To the resulting mixture, a dibutyl ether solution of butylmagnesium chloride (concentration: 2.2 mol/L, 760 kg) was added in a dropwise manner over five hours while the temperature of the mixture was maintained at 17° C. Q at this time was 0.37. The resulting mixture was stirred at 20° C. for one hour. After that, toluene (306 L) was added, thereby filtering the mixture. The obtained solid was washed with toluene (1104 L) three times, and toluene (355 L) was added to obtain a slurry of a precursor of a solid catalyst component 2.

(2) Synthesis of Solid Catalyst Component for Olefin Polymerization 2

A gas inside a cylindrical reactor equipped with a stirrer and four baffles was replaced with nitrogen gas. After that, the slurry of the precursor of a solid catalyst component 2 obtained in (1) was transferred using toluene (300 L). From the obtained transferred substance, 54 L of toluene was extracted. After that, while the obtained residue was stirred, a mixed solution of tetrachlorotitanium (920 kg) and dibutyl ether (20 kg) was added to the residue. Next, a toluene solution of o-phthaloyl chloride (concentration: 80 vol %, 70 kg) was added to the resultant. While the temperature of the resulting mixture was maintained at 110° C., the mixture was stirred for five hours, and then, filtered. The resultant was washed with toluene (1104 L) three times while the temperature inside the reactor was maintained at 110° C., and then, toluene (528 L) was added to obtain a slurry.

While the obtained slurry was stirred, a mixed solution of tetrachlorotitanium (375 kg), dibutyl ether (20 kg), and diisobutyl phthalate (17 kg) was added to the slurry. While the temperature of the resulting mixture was maintained at 105° C., the mixture was stirred for one hour, and then, filtered. The resultant was washed with toluene (1104 L) two times while the temperature inside the reactor was maintained at 110° C., and then, toluene (576 L) was added to obtain a slurry.

While the obtained slurry was stirred, a mixed solution of tetrachlorotitanium (375 kg) and dibutyl ether (20 kg) was added to the slurry. While the temperature of the resulting mixture was maintained at 105° C., the mixture was stirred for one hour, and then, filtered. The resultant was washed with toluene (1103 L) two times while the temperature inside the reactor was maintained at 110° C., and then, toluene (582 L) was added to obtain a slurry.

While the obtained slurry was stirred, a mixed solution of tetrachlorotitanium (376 kg) and dibutyl ether (20 kg) was added to the slurry. While the temperature of the resulting mixture was maintained at 105° C., the mixture was stirred for one hour, and then, filtered. The washing with toluene (1103 L) was performed three times while the temperature inside the reactor was maintained at 105° C. Next, the washing with hexane (1003 L) was performed four times.

Then, the resultant was dried to yield a solid catalyst component for olefin polymerization 2.

The obtained solid catalyst component for olefin polymerization 2 had LE1 of 69 μm (2201 pixels), LS1 of 75 μm (2413 pixels), E1 of 0.913, Ti atom in an amount of 2.0 wt %, and phthalate ester component in an amount of 9.4 wt %.

(3) Synthesis of Olefin-Based Polymer 2

The inside of a stainless steel autoclave having an interior volume of 3 L and equipped with a stirrer (hereinafter referred to as an "autoclave 1") was dried in vacuo, and a gas inside the autoclave 1 was replaced with argon gas and cooled. After that, the inside of the autoclave 1 was evacuated.

In a glass charger, heptane, triethylaluminum (2.6 mmol), cyclohexylethyldimethoxysilane (CHEDMS) (0.26 mmol) and the solid catalyst component for olefin polymerization 2 (30 mg) obtained in (2) were brought into contact with each other. The resulting contacted product was fed into the autoclave 1. Next, liquefied propylene (50 g) and liquefied butane (400 g) were fed into the autoclave 1, followed by feeding hydrogen gas (partial pressure: 0.007 MPa) into the autoclave 1. Then, the temperature inside the autoclave 1 was raised to 60° C. to start polymerization. After 20 minutes from the start of polymerization, unreacted propylene and butane were purged to the outside of the polymerization system, and the inside of the autoclave 1 was dried in vacuo. Then, triethylaluminum (2.6 mmol) was fed into the autoclave 1 under pressure. Next, hydrogen gas (partial pressure: 0.004 MPa) was fed.

After the autoclave 1 and an autoclave having an internal volume of 3 L (hereinafter referred to as "autoclave 2") were connected, the inside of the autoclave 2 was evacuated. Next, propylene (450 g), ethylene (20 g), and 1-butene (60 g) were fed into the autoclave 2. Next, the temperature inside the autoclave 2 was raised to 70° C., and the obtained mixed gas was continuously fed into the autoclave 1 to perform polymerization for 150 minutes at a pressure of 0.8 MPa. Then, the gas inside the autoclave 1 was purged to terminate the polymerization. The produced olefin-based polymer was dried in vacuo at 70° C. for one hour to yield an olefin-based polymer 2 (166 g).

The obtained olefin-based polymer 2 had LE2 of 1462 μm (2084 pixels), LS2 of 1655 μm (2358 pixels), E2 of 0.884, and a limiting viscosity [η] T of 1.61 dl/g. An amount of copolymer component in the obtained olefin-based polymer 2 was 85 wt %. In addition, an amount of ethylene monomer unit contained in the copolymer component was 4.0 wt %, and an amount of 1-butene monomer unit was 5.9 wt %.

Example 3

Solid Catalyst Component for Olefin Polymerization 3

(1) Synthesis of Precursor of Solid Catalyst Component 3

A gas inside a cylindrical reactor equipped with a stirrer and four baffles was replaced with nitrogen gas. After that, hexane (923 L), diisobutyl phthalate (7.8 kg), tetraethoxysilane (383 kg), and tetrabutoxytitanium (45 kg) were added and stirred. To the resulting mixture, a dibutyl ether solution of butylmagnesium chloride (concentration: 2.2 mol/L, 874 kg) was added in a dropwise manner over five hours while the temperature of the mixture was maintained at 5° C. Q at this time was 0.29. The resulting mixture was stirred at 35° C. for two hours. After that, toluene (501 L) was added, thereby filtering the mixture. The obtained solid was washed with toluene (1270 L) three times, and toluene (451 L) was added to obtain a slurry of a precursor of a solid catalyst component 3.

(2) Synthesis of Solid Catalyst Component for Olefin Polymerization 3

A gas inside a cylindrical reactor equipped with a stirrer and four baffles was replaced with nitrogen gas. After that, the slurry of the precursor of a solid catalyst component 3 obtained in (1) was transferred using toluene (302 L). While the obtained transferred substance was stirred, a mixed solution of tetrachlorotitanium (1015 kg) and dibutyl ether (23 kg) was added to the transferred substance. Next, a toluene solution of o-phthaloyl chloride (concentration: 80 vol %, 94 kg) was added to the mixture. While the temperature of the resulting mixture was maintained at 110° C., the mixture was stirred for five hours, and then, filtered. The resultant was washed with toluene (1404 L) three times while the temperature inside the reactor was maintained at 110° C., and then, toluene (671 L) was added to obtain a slurry.

While the obtained slurry was stirred, a mixed solution of tetrachlorotitanium (325 kg), dibutyl ether (23 kg), and diisobutyl phthalate (19 kg) was added to the slurry. While the temperature of the resulting mixture was maintained at 105° C., the mixture was stirred for one hour, and then, filtered. The resultant was washed with toluene (1268 L) one time while the temperature inside the reactor was maintained at 110° C., and then, toluene (674 L) was added to obtain a slurry.

While the obtained slurry was stirred, a mixed solution of tetrachlorotitanium (325 kg) and dibutyl ether (23 kg) was added to the slurry. While the temperature of the resulting mixture was maintained at 105° C., the mixture was stirred for one hour, and then, filtered. The resultant was washed with toluene (1268 L) one time while the temperature inside the reactor was maintained at 110° C., and then, toluene (641 L) was added to obtain a slurry.

While the obtained slurry was stirred, a mixed solution of tetrachlorotitanium (324 kg) and dibutyl ether (23 kg) was added to the slurry. While the temperature of the resulting mixture was maintained at 105° C., the mixture was stirred for one hour, and then, filtered. The washing with toluene (1268 L) was performed six times while the temperature inside the reactor was maintained at 110° C. Next, the washing with hexane (1153 L) was performed four times. Then, the resultant was dried to yield a solid catalyst component for olefin polymerization 3.

The obtained solid catalyst component for olefin polymerization 3 had LE1 of 135 μm (2545 pixels), LS1 of 152 μm (2866 pixels), E1 of 0.889, Ti atom in an amount of 1.6 wt %, and phthalate ester component in an amount of 10.7 wt %.

(3) Synthesis of Olefin-Based Polymer 3

The inside of a stainless steel autoclave having an interior volume of 5 L and equipped with a stirrer (hereinafter referred to as an "autoclave 1") was dried in vacuo, and a gas inside the autoclave 1 was replaced with argon gas and cooled. After that, the inside of the autoclave 1 was evacuated.

In a glass charger, heptane, triethylaluminum (6.6 mmol), cyclohexylethyldimethoxysilane (CHEDMS) (0.66 mmol) and the solid catalyst component for olefin polymerization 3 (44 mg) obtained in (2) were brought into contact with each other. The resulting contacted product was fed into the autoclave 1. Next, liquefied propylene (75 g) and liquefied butane (600 g) were fed into the autoclave 1, followed by feeding hydrogen gas (partial pressure: 0.007 MPa) into the autoclave 1. Then, the temperature inside the autoclave 1 was raised to 60° C. to start polymerization. After 20 minutes from the start of polymerization, unreacted propylene and butane were purged to the outside of the polymerization system, and the inside of the autoclave 1 was dried in vacuo. Next, triethylaluminum (6.6 mmol) was fed into the autoclave 1 under pressure, followed by feeding hydrogen gas (partial pressure: 0.001 MPa).

After the autoclave 1 and an autoclave having an internal volume of 3 L (hereinafter referred to as "autoclave 2") were connected, the inside of the autoclave 2 was evacuated. Next, propylene (450 g), ethylene (25 g), and 1-butene (60 g) were fed into the autoclave 2. Next, the temperature inside the autoclave 2 was raised to 70° C., and the obtained mixed gas was continuously fed into the autoclave 1 to perform polymerization for 150 minutes at a pressure of 0.8 MPa. Then, the gas inside the autoclave 1 was purged to terminate the polymerization. The produced olefin-based polymer was dried in vacuo at 70° C. for one hour to obtain an olefin-based polymer 3 (379 g).

The obtained olefin-based polymer 3 had LE2 of 2669 μm (2349 pixels), LS2 of 3029 μm (2666 pixels), E2 of 0.883, and a limiting viscosity [η] T of 1.61 dl/g. An amount of copolymer component in the obtained olefin-based polymer 3 was 92 wt %. In addition, an amount of ethylene monomer unit contained in the copolymer component was 4.0 wt %, and an amount of 1-butene monomer unit was 8.6 wt %.

Example 4

Solid Catalyst Component for Olefin Polymerization 4

(1) Synthesis of Precursor of Solid Catalyst Component 4

A gas inside a cylindrical reactor equipped with a stirrer and four baffles was replaced with nitrogen gas. After that, hexane (177 mL), diisobutyl phthalate (1.6 g), tetraethoxysilane (79 mL), and tetrabutoxytitanium (9.1 g) were added and stirred. To the resulting mixture, a dibutyl ether solution of butylmagnesium chloride (concentration: 2.2 mol/L, 197 mL) was added in a dropwise manner over five hours while the temperature of the mixture was maintained at 7° C. Q at this time was 0.19. The resulting mixture was stirred at 35° C. for two hours, and then, filtered. The obtained solid was washed with toluene (238 mL) three times, and toluene (83 mL) was added to obtain a slurry. The obtained slurry was stirred at 70° C. for one hour to obtain a slurry of a precursor of a solid catalyst component 4.

(2) Synthesis of Solid Catalyst Component for Olefin Polymerization

A gas inside a reactor equipped with a stirrer and four baffles was replaced with nitrogen gas. After that, the slurry of the precursor of a solid catalyst component 4 (37 mL) obtained in (1) was transferred. After 10 mL of supernatant toluene was extracted, while the obtained transferred substance was stirred, a mixed solution of tetrachlorotitanium (16 mL) and dibutyl ether (0.8 mL) was added to the transferred substance. Next, a toluene solution of o-phthaloyl chloride (concentration: 80 vol %, 2.0 mL was added to the mixture. The resulting mixture was stirred for five hours while the temperature of the mixture was maintained at 110° C. After that, toluene (19 mL) was added, thereby filtering the mixture. The resultant was washed with toluene (38 mL) three times while the temperature inside the reactor was maintained at 100° C., and then, toluene (14 mL) was added to obtain a slurry.

While the obtained slurry was stirred, a mixed solution of tetrachlorotitanium (5.1 mL), dibutyl ether (0.8 mL), and diisobutyl phthalate (0.5 mL) was added to the slurry. The resulting mixture was stirred for one hour while the temperature of the mixture was maintained at 105° C. After that, toluene (28 mL) was added, thereby filtering the mixture. The resultant was washed with toluene (35 mL) three times while the temperature inside the reactor was maintained at 100° C., and then, toluene (14 mL) was added to obtain a slurry.

While the obtained slurry was stirred, a mixed solution of tetrachlorotitanium (5.1 mL) and dibutyl ether (0.8 mL) was added to the slurry. The resulting mixture was stirred for one hour while the temperature of the mixture was maintained at 105° C. After that, toluene (28 mL) was added, thereby filtering the mixture. The resultant was washed with toluene (35 mL) three times while the temperature inside the reactor was maintained at 100° C., and then, toluene (14 mL) was added to obtain a slurry.

While the obtained slurry was stirred, a mixed solution of tetrachlorotitanium (5.1 mL) and dibutyl ether (0.8 mL) was added to the slurry. The resulting mixture was stirred for one hour while the temperature of the mixture was maintained at 105° C. After that, toluene (28 mL) was added, thereby filtering the mixture. The washing with toluene (30 mL) was performed three times while the temperature inside the reactor was maintained at 100° C. Next, the washing with hexane (31 mL) was performed four times. Then, the resultant was dried to yield a solid catalyst component for olefin polymerization 4.

The obtained solid catalyst component for olefin polymerization 4 had LE1 of 80 μm (2022 pixels), LS1 of 95 μm (2399 pixels), E1 of 0.845, Ti atom in an amount of 2.4 wt %, and phthalate ester component in an amount of 11.3 wt %.

(3) Synthesis of Olefin-Based Polymer 4

The inside of a stainless steel autoclave having an interior volume of 5 L and equipped with a stirrer (hereinafter referred to as an "autoclave 1") was dried in vacuo, and a gas inside the autoclave 1 was replaced with argon gas and cooled. After that, the inside of the autoclave 1 was evacuated.

In a glass charger, heptane, triethylaluminum (6.6 mmol), cyclohexylethyldimethoxysilane (CHEDMS) (0.66 mmol) and the solid catalyst component for olefin polymerization 4 (43 mg) obtained in (2) were brought into contact with each other. The resulting contacted product was fed into the autoclave 1. Next, liquefied propylene (75 g) and liquefied butane (600 g) were fed into the autoclave 1, followed by feeding hydrogen gas (partial pressure: 0.007 MPa) into the autoclave 1. Then, the temperature inside the autoclave 1 was raised to 60° C. to start polymerization. After 20 minutes from the start of polymerization, unreacted propylene and butane were purged to the outside of the polymerization system, and the inside of the autoclave 1 was dried in vacuo. Next, triethylaluminum (6.6 mmol) was fed into the autoclave 1 under pressure, followed by feeding hydrogen gas (partial pressure: 0.001 MPa).

After the autoclave 1 and an autoclave having an internal volume of 3 L (hereinafter referred to as "autoclave 2") were connected, the inside of the autoclave 2 was evacuated. Next, propylene (450 g), ethylene (25 g), and 1-butene (60 g) were fed into the autoclave 2. Next, the temperature in the autoclave 2 was raised to 70° C., and the obtained mixed gas was continuously fed into the autoclave 1 to perform polymerization for 70 minutes at a pressure of 0.8 MPa. Then, the gas inside the autoclave 1 was purged to terminate the polymerization. The produced olefin-based polymer was dried in vacuo at 70° C. for one hour to yield an olefin-based polymer 4 (404 g).

The obtained olefin-based polymer 4 had LE2 of 2454 μm (2145 pixels), LS2 of 2898 μm (2536 pixels), E2 of 0.848, and a limiting viscosity [η] T of 1.66 dl/g. An amount of copolymer component in the obtained olefin-based polymer 4 was 87 wt %. In addition, an amount of ethylene monomer unit contained in the copolymer component was 4.0 wt %, and an amount of 1-butene monomer unit was 7.7 wt %.

Comparative Example 1

Solid Catalyst Component for Olefin Polymerization C1

(1) Synthesis of Precursor of Solid Catalyst Component C1

A gas inside a cylindrical reactor equipped with a stirrer and four baffles was replaced with nitrogen gas. After that, hexane (923 L), tetraethoxysilane (383 kg), and tetrabutoxytitanium (44 kg) were added and stirred. To the resulting mixture, a dibutyl ether solution of butylmagnesium chloride (concentration: 2.2 mol/L, 874 kg) was added in a dropwise manner over five hours while the temperature of the mixture was maintained at 17° C. Q at this time was 0.53. The resulting mixture was stirred at 35° C. for one hour. After that, toluene (554 L) was added, thereby filtering the mixture. The obtained solid was washed with toluene (1269 L) three times, and toluene (407 L) was added to obtain a slurry of a precursor of a solid catalyst component C1.

(2) Synthesis of Solid Catalyst Component for Olefin Polymerization C1

A gas inside a cylindrical reactor equipped with a stirrer and four baffles was replaced with nitrogen gas. After that, the slurry of the precursor of a solid catalyst component C1 obtained in (1) was transferred using toluene (303 L). While the obtained transferred substance was stirred, a mixed solution of tetrachlorotitanium (1014 kg) and dibutyl ether (23 kg) was added to the transferred substance. Next, a toluene solution of o-phthaloyl chloride (concentration: 80 vol %, 90 kg) was added to the mixture. While the temperature of the resulting mixture was maintained at 110° C., the mixture was stirred for five hours, and then, filtered. The resultant was washed with toluene (1404 L) three times while the temperature inside the reactor was maintained at 110° C., and then, toluene (592 L) was added to obtain a slurry.

While the obtained slurry was stirred, a mixed solution of tetrachlorotitanium (324 kg), dibutyl ether (23 kg), and diisobutyl phthalate (38 kg) was added to the slurry. While the temperature of the resulting mixture was maintained at 105° C., the mixture was stirred for one hour, and then, filtered. The resultant was washed with toluene (1270 L) one time while the temperature inside the reactor was maintained at 112° C., and then, toluene (570 L) was added to obtain a slurry.

While the obtained slurry was stirred, a mixed solution of tetrachlorotitanium (325 kg) and dibutyl ether (23 kg) was added to the slurry. While the temperature of the resulting mixture was maintained at 105° C., the mixture was stirred for one hour, and then, filtered. The resultant was washed with toluene (1269 L) one time while the temperature inside the reactor was maintained at 112° C., and then, toluene (580 L) was added to obtain a slurry.

While the obtained slurry was stirred, a mixed solution of tetrachlorotitanium (325 kg) and dibutyl ether (23 kg) was added to the slurry. While the temperature of the resulting mixture was maintained at 105° C., the mixture was stirred for one hour, and then, filtered. The washing with toluene (1270 L) was performed three times while the temperature inside the reactor was maintained at 110° C. Next, the washing with hexane (1153 L) was performed three times. Then, the resultant was dried to yield a solid catalyst component for olefin polymerization C1.

The obtained solid catalyst component for olefin polymerization C1 was LE1 of 53 μm (2181 pixels), LS1 of 57 μm (2370 pixels), E1 0.921, Ti atom in an amount of 2.0 wt %, and phthalate ester component in an amount of 11.9 wt %.

(3) Synthesis of Olefin-Based Polymer C1

The inside of a stainless steel autoclave having an interior volume of 5 L and equipped with a stirrer (hereinafter referred to as an "autoclave 1") was dried in vacuo, and a gas inside the autoclave 1 was replaced with argon gas and cooled. After that, the inside of the autoclave 1 was evacuated.

In a glass charger, heptane, triethylaluminum (6.6 mmol), cyclohexylethyldimethoxysilane (CHEDMS) (0.66 mmol) and the solid catalyst component for olefin polymerization C1 (42 mg) obtained in (2) were brought into contact with each other. The resulting contacted product was fed into the autoclave 1. Next, liquefied propylene (75 g) and liquefied butane (600 g) were fed into the autoclave 1, followed by feeding hydrogen gas (partial pressure: 0.007 MPa) into the autoclave 1. Then, the temperature inside the autoclave 1 was raised to 60° C. to start polymerization. After 20 minutes from the start of polymerization, unreacted propylene and butane were purged to the outside of the polymerization system, and the inside of the autoclave 1 was dried in vacuo. Next, triethylaluminum (6.6 mmol) was fed into the autoclave 1 under pressure, followed by feeding hydrogen gas (partial pressure: 0.001 MPa).

After the autoclave 1 and an autoclave having an internal volume of 3 L (hereinafter referred to as "autoclave 2") were connected, the inside of the autoclave 2 was evacuated. Next, propylene (450 g), ethylene (25 g), and 1-butene (60 g) were fed into the autoclave 2. Next, the temperature in the autoclave 2 was raised to 70° C., and the obtained mixed gas was continuously fed into the autoclave 1 to perform polymerization for 90 minutes at a pressure of 0.8 MPa. Then, the gas inside the autoclave 1 was purged to terminate the polymerization. The produced olefin-based polymer was dried in vacuo at 70° C. for one hour to yield an olefin-based polymer C1 (375 g).

The obtained olefin-based polymer C1 had LE2 of 2038 μm (2957 pixels), LS2 of 2309 μm (3350 pixels), E2 of 0.886, and a limiting viscosity [η] T of 1.62 dl/g. An amount of copolymer component in the obtained olefin-based polymer C1 was 89 wt %. In addition, an amount of ethylene monomer unit contained in the copolymer component was 4.3 wt %, and an amount of 1-butene monomer unit was 7.6 wt %.

Comparative Example 2

Solid Catalyst Component for Olefin Polymerization C2

(1) Synthesis of Precursor of Solid Catalyst Component C2

A gas inside a cylindrical reactor equipped with a stirrer and four baffles was replaced with nitrogen gas. After that, hexane (174 mL), diisobutyl phthalate (1.5 g), tetraethoxysilane (78 mL), and tetrabutoxytitanium (9.0 g) were added and stirred. To the resulting mixture, a dibutyl ether solution of butylmagnesium chloride (concentration: 2.2 mol/L, 194 mL) was added in a dropwise manner over five hours while the temperature of the mixture was maintained at 7° C. Q at this time was 0.11. The resulting mixture was stirred at 35° C. for two hours, and then, filtered. The obtained solid was washed with toluene (238 mL) three times, and toluene (83 mL) was added to obtain a slurry. The obtained slurry was stirred at 70° C. for one hour to obtain a slurry of a precursor of a solid catalyst component C2.

(2) Synthesis of Solid Catalyst Component for Olefin Polymerization

A gas inside a reactor equipped with a stirrer and four baffles was replaced with nitrogen gas. After that, the slurry of the precursor of a solid catalyst component C2 (34 mL) obtained in (1) was transferred. While the obtained transferred substance was stirred, a mixed solution of tetrachlorotitanium (14 mL) and dibutyl ether (0.7 mL) was added to the transferred substance. Next, a toluene solution of o-phthaloyl chloride (concentration: 80 vol %, 1.7 mL) was added to the mixture. The resulting mixture was stirred for five hours while the temperature of the mixture was maintained at 110° C. After that, toluene (16 mL) was added, thereby filtering the mixture. The resultant was washed with toluene (34 mL) three times while the temperature inside the reactor was maintained at 100° C., and then, toluene (14 mL) was added to obtain a slurry.

While the obtained slurry was stirred, a mixed solution of tetrachlorotitanium (4.5 mL), dibutyl ether (0.7 mL), and diisobutyl phthalate (0.4 mL) was added to the slurry. The resulting mixture was stirred for one hour while the temperature of the mixture was maintained at 105° C. After that, toluene (25 mL) was added, thereby filtering the mixture. The resultant was washed with toluene (34 mL) three times while the temperature inside the reactor was maintained at 100° C., and then, toluene (14 mL) was added to obtain a slurry.

While the obtained slurry was stirred, a mixed solution of tetrachlorotitanium (4.5 mL) and dibutyl ether (0.7 mL) was added to the slurry. The resulting mixture was stirred for one hour while the temperature of the mixture was maintained at 105° C. After that, toluene (25 mL) was added, thereby filtering the mixture. The resultant was washed with toluene (30 mL) three times while the temperature inside the reactor was maintained at 100° C., and then, toluene (14 mL) was added to obtain a slurry.

While the obtained slurry was stirred, a mixed solution of tetrachlorotitanium (4.5 mL) and dibutyl ether (0.7 mL) was added to the slurry. The resulting mixture was stirred for one hour while the temperature of the mixture was maintained at 105° C. After that, toluene (25 mL) was added, thereby filtering the mixture. The washing with toluene (30 mL) was performed three times while the temperature inside the reactor was maintained at 100° C. Next, the washing with hexane (28 mL) was performed four times. Then, the resultant was dried to yield a solid catalyst component for olefin polymerization C2.

The obtained solid catalyst component for olefin polymerization C2 had LE1 of 83 μm (2205 pixels), LS1 of 105 μm (2767 pixels), E1 of 0.800, Ti atom in an amount of 1.9 wt %, and phthalate ester component in an amount of 13.3 wt %.

(3) Synthesis of Olefin-Based Polymer C2

The inside of a stainless steel autoclave having an interior volume of 5 L and equipped with a stirrer (hereinafter referred to as an "autoclave 1") was dried in vacuo, and a gas inside the autoclave 1 was replaced with argon gas and cooled. After that, the inside of the autoclave 1 was evacuated.

In a glass charger, heptane, triethylaluminum (6.6 mmol), cyclohexylethyldimethoxysilane (CHEDMS) (0.66 mmol) and the solid catalyst component for olefin polymerization C2 (45 mg) obtained in (2) were brought into contact with each other. The resulting contacted product was fed into the autoclave 1. Next, liquefied propylene (75 g) and liquefied butane (600 g) were fed into the autoclave 1, followed by feeding hydrogen gas (partial pressure: 0.007 MPa) into the autoclave 1. Then, the temperature inside the autoclave 1 was raised to 60° C. to start polymerization. After 20 minutes from the start of polymerization, unreacted propylene and butane were purged to the outside of the polymerization system, and the inside of the autoclave 1 was dried in vacuo. Next, triethylaluminum (6.6 mmol) was fed into the autoclave 1 under pressure, followed by feeding hydrogen gas (partial pressure: 0.001 MPa).

After the autoclave 1 and an autoclave having an internal volume of 3 L (hereinafter referred to as "autoclave 2") were connected, the inside of the autoclave 2 was evacuated. Next, propylene (450 g), ethylene (25 g), and 1-butene (60 g) were fed into the autoclave 2. Next, the temperature in the autoclave 2 was raised to 70° C., and the obtained mixed gas was continuously fed into the autoclave 1 to perform polymerization for 65 minutes at a pressure of 0.8 MPa. Then, the gas inside the autoclave 1 was purged to terminate the polymerization. The produced olefin-based polymer was dried in vacuo at 70° C. for one hour to obtain an olefin-based polymer C2 (405 g).

The obtained olefin-based polymer C2 had LE2 of 2768 μm (2561 pixels), LS2 of 3395 μm (3139 pixels), E2 of 0.818, and a limiting viscosity [η] T of 1.80 dl/g. An amount of copolymer component in the obtained olefin-based polymer C2 was 88 wt %. In addition, an amount of ethylene monomer unit contained in the copolymer component was 4.6 wt %, and an amount of 1-butene monomer unit was 7.5 wt %.

Comparative Example 3

Solid Catalyst Component for Olefin Polymerization C3

(1) Synthesis of Precursor of Solid Catalyst Component C3

A gas inside a cylindrical reactor equipped with a stirrer and four baffles was replaced with nitrogen gas. After that, hexane (173 mL), diisobutyl phthalate (1.7 g), tetraethoxysilane (77 mL), and tetrabutoxytitanium (8.9 g) were added and stirred. To the resulting mixture, a dibutyl ether solution of butylmagnesium chloride (concentration: 2.2 mol/L, 192 mL) was added in a dropwise manner over five hours while the temperature of the mixture was maintained at 7° C. Q at this time was 0.028. The resulting mixture was stirred at 35° C. for two hours, and then, filtered. The obtained solid was washed with toluene (238 mL) three times, and toluene (83 mL) was added to obtain a slurry. The obtained slurry was stirred at 70° C. for one hour to obtain a slurry of a precursor of a solid catalyst component C3.

(2) Synthesis of Solid Catalyst Component for Olefin Polymerization C3

A gas inside a reactor equipped with a stirrer and four baffles was replaced with nitrogen gas. After that, the slurry of the precursor of a solid catalyst component C3 (34 mL) obtained in (1) was transferred. While the obtained transferred substance was stirred, a mixed solution of tetrachlorotitanium (14 mL) and dibutyl ether (0.7 mL) was added to the transferred substance. Next, a toluene solution of o-phthaloyl chloride (concentration: 80 vol %, 1.7 mL) was added to the mixture. The resulting mixture was stirred for five hours while the temperature of the mixture was maintained at 110° C. After that, toluene (16 mL) was added, thereby filtering the mixture. The resultant was washed with toluene (34 mL) three times while the temperature inside the reactor was maintained at 100° C., and then, toluene (12 mL) was added to obtain a slurry.

While the obtained slurry was stirred, a mixed solution of tetrachlorotitanium (4.5 mL), dibutyl ether (0.7 mL), and diisobutyl phthalate (0.4 mL) was added to the slurry. The resulting mixture was stirred for one hour while the temperature of the mixture was maintained at 105° C. After that, toluene (25 mL) was added, thereby filtering the mixture. The resultant was washed with toluene (34 mL) three times while the temperature inside the reactor was maintained at 100° C., and then, toluene (14 mL) was added to obtain a slurry.

While the obtained slurry was stirred, a mixed solution of tetrachlorotitanium (4.5 mL) and dibutyl ether (0.7 mL) was added to the slurry. The resulting mixture was stirred for one hour while the temperature of the mixture was maintained at 105° C. After that, toluene (25 mL) was added, thereby filtering the mixture. The resultant was washed with toluene (30 mL) three times while the temperature inside the reactor was maintained at 100° C., and then, toluene (13 mL) was added to obtain a slurry.

While the obtained slurry was stirred, a mixed solution of tetrachlorotitanium (4.5 mL) and dibutyl ether (0.7 mL) was added to the slurry. The resulting mixture was stirred for one hour while the temperature of the mixture was maintained at 105° C. After that, toluene (25 mL) was added, thereby filtering the mixture. The washing with toluene (30 mL) was performed three times while the temperature inside the reactor was maintained at 100° C. Next, the washing with hexane (28 mL) was performed four times. Then, the resultant was dried to yield a solid catalyst component for olefin polymerization C3.

The obtained solid catalyst component for olefin polymerization C3 had LE1 of 86 μm (2271 pixels), LS1 of 114 μm (2984 pixels), E1 of 0.765, Ti atom in an amount of 2.0 wt %, and phthalate ester component in an amount of 13.1 wt %.

(3) Synthesis of Olefin-Based Polymer C3

The inside of a stainless steel autoclave having an interior volume of 5 L and equipped with a stirrer (hereinafter referred to as an "autoclave 1") was dried in vacuo, and a gas inside the autoclave 1 was replaced with argon gas and cooled. After that, the inside of the autoclave 1 was evacuated.

In a glass charger, heptane, triethylaluminum (6.6 mmol), cyclohexylethyldimethoxysilane (CHEDMS) (0.66 mmol) and the solid catalyst component for olefin polymerization C3 (45 mg) obtained in (2) were brought into contact with each other. The resulting contacted product was fed into the autoclave 1. Next, liquefied propylene (75 g) and liquefied butane (600 g) were fed into the autoclave 1, followed by feeding hydrogen gas (partial pressure: 0.007 MPa) into the autoclave 1. Then, the temperature inside the autoclave 1 was raised to 60° C. to start polymerization. After 20 minutes from the start of polymerization, unreacted propylene and butane were purged to the outside of the polymerization system, and the inside of the autoclave 1 was dried in vacuo. Next, triethylaluminum (6.6 mmol) was fed into the autoclave 1 under pressure, followed by feeding hydrogen gas (partial pressure: 0.001 MPa).

After the autoclave 1 and an autoclave having an internal volume of 3 L (hereinafter referred to as "autoclave 2") were connected, the inside of the autoclave 2 was evacuated. Next, propylene (450 g), ethylene (25 g), and 1-butene (60 g) were fed into the autoclave 2. Next, the temperature in the autoclave 2 was raised to 70° C., and the obtained mixed gas was continuously fed into the autoclave 1 to perform polymerization for 100 minutes at a pressure of 0.8 MPa. Then, the gas inside the autoclave 1 was purged to terminate the polymerization. The produced olefin-based polymer was dried in vacuo at 70° C. for one hour to obtain an olefin-based polymer C3 (379 g).

The obtained olefin-based polymer C3 had LE2 of 4212 μm (2504 pixels), LS2 of 5393 μm (3194 pixels), E2 of 0.786, and a limiting viscosity [η] T of 1.98 dl/g. An amount of copolymer component in the obtained olefin-based polymer C3 was 88 wt %. In addition, an amount of ethylene monomer unit contained in the copolymer component was 4.5 wt %, and an amount of 1-butene monomer unit was 7.5 wt %.

TABLE 1

| | | Example 1 | Example 2 | Example 3 | Example 4 | Comparative Example 1 | Comparative Example 2 | Comparative Example 3 |
|---|---|---|---|---|---|---|---|---|
| Precursor of Solid Catalyst Component | D (-) | 1.39 | 1.39 | 1.39 | 1.76 | 1.39 | 1.76 | 1.37 |
| | W (-) | 0.200 | 0.200 | 0.200 | 0.155 | 0.200 | 0.155 | 0.102 |
| | n (rps) | 1.42 | 2.08 | 1.58 | 5.83 | 2.92 | 3.25 | 1.67 |
| | VF (mol/s) | $1.088 \times 10^{-1}$ | $1.088 \times 10^{-1}$ | $1.251 \times 10^{-1}$ | $2.408 \times 10^{-5}$ | $1.251 \times 10^{-1}$ | $2.371 \times 10^{-5}$ | $2.347 \times 10^{-5}$ |
| | Q (-) | 0.25 | 0.37 | 0.29 | 0.19 | 0.53 | 0.11 | 0.028 |
| Solid catalyst component for olefin polymerization | LE1 (μm) | 122 | 69 | 135 | 80 | 53 | 83 | 86 |
| | LS1 (μm) | 141 | 75 | 152 | 95 | 57 | 105 | 114 |
| | E1 (-) | 0.868 | 0.913 | 0.889 | 0.845 | 0.921 | 0.800 | 0.765 |
| | Ti atom (wt %) | 1.6 | 2.0 | 1.6 | 2.4 | 2.0 | 1.9 | 2.0 |
| | Phthalate Ester Component (wt %) | 10.5 | 9.4 | 10.7 | 11.3 | 11.9 | 13.3 | 13.1 |
| | BET Method Specific Surface Area (m$^2$/g) | 325 | 397 | 384 | 345 | 339 | 345 | 352 |
| Olefin-based Polymer | LE2 (μm) | 2358 | 1462 | 2669 | 2454 | 2038 | 2768 | 4212 |
| | LS2 (μm) | 2728 | 1655 | 3029 | 2898 | 2309 | 3395 | 5393 |
| | E2 (-) | 0.864 | 0.884 | 0.883 | 0.848 | 0.886 | 0.818 | 0.786 |
| | Limiting Viscosity [η] T (dl/g) | 1.52 | 1.61 | 1.61 | 1.66 | 1.62 | 1.8 | 1.98 |
| | Copolymer Component EPB (wt %) | 86 | 85 | 92 | 87 | 89 | 88 | 88 |

TABLE 1-continued

|  | Example 1 | Example 2 | Example 3 | Example 4 | Comparative Example 1 | Comparative Example 2 | Comparative Example 3 |
|---|---|---|---|---|---|---|---|
| Amount of Ethylene (wt %) | 3.8 | 4.0 | 4.0 | 4.0 | 4.3 | 4.6 | 4.5 |
| Amount of 1-butene (wt %) | 6.3 | 5.9 | 8.6 | 7.7 | 7.6 | 7.5 | 7.5 |
| BD_20 to 25° C. room temperature (g/cm$^3$) | 0.431 | 0.385 | 0.396 | 0.365 | 0.393 | 0.383 | 0.359 |
| BD_60° C. (g/cm$^3$) | 0.428 | 0.375 | 0.387 | 0.353 | 0.379 | 0.361 | 0.333 |
| ΔBD (g/cm$^3$) | −0.003 | −0.01 | −0.009 | −0.012 | −0.014 | −0.022 | −0.026 |

Compared to olefin-based polymers produced in Comparative Examples 1 to 3, those produced in Examples 1 to 4 (that is, the olefin-based polymer according to the present invention) has a minor amount of decrease in bulk density due to heat (ΔBD (g/cm$^3$)). This indicates that heating an olefin-based polymer causes surface stickiness but the olefin-based polymer to be produced herein has a small degree of adhesion between particles. Therefore, in production of an olefin-based polymer, using the solid catalyst component for olefin polymerization of the present invention makes it possible to remedy clogging of a polymerization device and adhesion of a polymer to a wall surface of the polymerization device during olefin polymerization. In addition, it is possible to increase the weight of an olefin-based polymer to be produced by a polymerization device and to increase a flow rate of gas flowing through the polymerization device, thereby improving the productivity of a polymer.

What is claimed is:

1. A solid catalyst component for olefin polymerization containing a titanium atom, a magnesium atom, a halogen atom, and an internal electron donor, and having an envelope E1 calculated by the following Formula (1) in a range of 0.810 to 0.920:

$$E1=LE1/LS1 \quad (1)$$

wherein LE1 is a convex hull perimeter of the solid catalyst component for olefin polymerization obtained from an image of the solid catalyst component for olefin polymerization captured with a scanning electron microscope, and LS1 is an actual perimeter of the solid catalyst component for olefin polymerization obtained from the image of the solid catalyst component for olefin polymerization captured with the scanning electron microscope.

2. The solid catalyst component for olefin polymerization according to claim 1, wherein E1 is 0.840 to 0.920.

3. The solid catalyst component for olefin polymerization according to claim 2, wherein E1 is 0.860 to 0.915.

4. The solid catalyst component for olefin polymerization according claim 1, wherein the internal electron donor is at least one selected from the group consisting of monoester compounds, aliphatic dicarboxylic acid ester compounds, aromatic dicarboxylic acid ester compounds, diol diester compounds, and ether compounds.

5. The solid catalyst component for olefin polymerization according to claim 1, wherein the internal electron donor is at least one selected from the group consisting of aliphatic dicarboxylic acid ester compounds, and aromatic dicarboxylic acid ester compounds.

6. The solid catalyst component for olefin polymerization according to claim 1, wherein an olefin contains at least one component selected from propylene, ethylene, and 1-butene.

7. A catalyst for olefin polymerization containing the solid catalyst component for olefin polymerization according to claim 1, and an organoaluminum compound.

8. A method for producing an olefin-based polymer, the method comprising olefin polymerization in the presence of the catalyst for olefin polymerization according to claim 7.

* * * * *